United States Patent
Thomson et al.

(10) Patent No.: US 12,547,763 B2
(45) Date of Patent: Feb. 10, 2026

(54) DIGITAL ASSET (DA) MOVE OPTION BETWEEN PERSONAL AND SHARED DA LIBRARIES

(71) Applicant: Apple Inc., Cupertino, CA (US)

(72) Inventors: Gavin B. Thomson, Mountain View, CA (US); Alisha Sindhwani, San Francisco, CA (US); Ge Yan, Los Altos, CA (US); Javeed Shaikh, San Mateo, CA (US); Julien J. Jalon, Rennes (FR)

(73) Assignee: Apple Inc., Cupertino, CA (US)

( * ) Notice: Subject to any disclaimer, the term of this patent is extended or adjusted under 35 U.S.C. 154(b) by 314 days.

(21) Appl. No.: 18/328,622

(22) Filed: Jun. 2, 2023

(65) Prior Publication Data

US 2023/0394172 A1 Dec. 7, 2023

Related U.S. Application Data

(60) Provisional application No. 63/365,825, filed on Jun. 3, 2022.

(51) Int. Cl.
*G06F 21/62* (2013.01)
*G06F 21/60* (2013.01)

(52) U.S. Cl.
CPC ........ G06F 21/6245 (2013.01); G06F 21/604 (2013.01)

(58) Field of Classification Search
CPC ........................... G06F 21/604; G06F 21/6245
See application file for complete search history.

(56) References Cited

U.S. PATENT DOCUMENTS

| | | | |
|---|---|---|---|
| 11,503,373 B2 * | 11/2022 | Patricks | H04N 21/458 |
| 2008/0062283 A1 * | 3/2008 | Matsushita | G06F 16/58 |
| | | | 386/E9.036 |
| 2008/0147711 A1 * | 6/2008 | Spiegelman | G06F 16/4387 |
| | | | 707/999.102 |

(Continued)

OTHER PUBLICATIONS

Fleishman, Glenn, "How to remove location data in photos that you want to share," Jan. 28, 2022, XP93072412, Retrieved from the Internet: URL: http://web.archive.org/web/20220128093240/https://www.macworld.com/article/351888/how-to-remove-location-data-in-shared-photos.html [retrieved on Aug. 9, 2023].

*Primary Examiner* — Tarek Chbouki
(74) *Attorney, Agent, or Firm* — Blank Rome LLP

(57) ABSTRACT

This disclosure relates to techniques for managing digital assets (DAs). An example method includes: establishing, by one or more server devices, a personal DA library having DAs and related DA records, each of the DA records including a set of fields including a master record of a respective DA; establishing, by the one or more server devices, a shared DA library separate from the personal DA library; receiving, by the one or more server devices, a share DA instruction related to a particular DA in the personal DA library; transferring a first part of the DA record for the particular DA from the personal DA library to the shared DA library, the first part including the master record; and, after completing said transferring, maintaining a second part of the DA record for the particular DA in the personal DA library, wherein the second part does not include the master record.

18 Claims, 10 Drawing Sheets

(56) References Cited

U.S. PATENT DOCUMENTS

| | | | |
|---|---|---|---|
| 2013/0330019 A1* | 12/2013 | Kim | G06F 16/58 |
| | | | 382/298 |
| 2014/0310316 A1* | 10/2014 | Coburn, IV | H04N 21/8133 |
| | | | 707/799 |
| 2015/0365729 A1* | 12/2015 | Kaya | H04N 21/6582 |
| | | | 725/14 |
| 2018/0349011 A1* | 12/2018 | Morag | G06F 16/9536 |
| 2019/0012053 A1 | 1/2019 | Hawa | |
| 2021/0336909 A1* | 10/2021 | Taitz | H04L 51/043 |
| 2025/0013016 A1* | 1/2025 | Son | G02B 13/18 |

* cited by examiner

DIGITAL ASSET (DA) MOVE OPTION BETWEEN PERSONAL AND SHARED DA LIBRARIES

TECHNICAL FIELD

This disclosure relates generally to the field of content management for end-user devices in a networked environment. More particularly, the disclosure relates to systems and methods that support digital asset (DA) move options between personal and shared DA libraries.

BACKGROUND

Modern consumer electronic devices (e.g., end-user devices) have enabled users to create, purchase, and amass considerable amounts of digital assets (e.g., images, videos, etc.). For example, computing systems (e.g., a smartphone, a stationary computer system, a portable computer system, a media player, a tablet computer system, a wearable computer system or device, etc.) routinely have access to tens of thousands and even hundreds of thousands of photos/videos, and collections of photos/videos.

The digital assets (DAs) obtained by end-user devices may be categorized in different ways. One way to categorize DAs relates to relative priority (e.g., designating DAs as primary DAs and secondary DAs). Primary DAs may be captured by sensors (e.g., cameras, microphones, etc.) included with the end-user device, external sensors coupled to the end-user device (e.g., an external web camera, specialty camera, etc.), or is obtained from trusted sources associated with the user (e.g., the photo library of the user's cloud account; the photo library of the user's computer, laptop, or other display device; direct imports from cameras, memory cards, scanners or other devices; imports from end-user devices that are previously identified as a trusted source by a user; and/or any other trusted sources). Secondary DAs may be received by the end-user device from other users' devices via a wired or wireless communication interface, or from other secondary sources (e.g., any application on the end-user device which can receive DAs; the photo library of another user's end-user device; imports from end-user devices that are not previously identified as a trusted source by a user). Primary DAs may be automatically added to a personal photo library of an end-user, while secondary DAs may not be automatically added to the personal DA library of the end-user device. The personal photo library provides various options to query, organize, and highlight DAs.

One of the benefits of categorizing DAs according to relative priority (e.g., a primary DA or a secondary DA designation) or other categories is that it may allow an end-user to better assess how to manage a personal DA library accessed or backed up via a cloud-based platform. For different end-users, the amount of cloud-based storage for their respective personal photo libraries may vary as a subscription option, which may influence how each end-user or control interface decides to manage populating an end-user's personal DA library with DAs. Another service being developed as a cloud-based platform feature accessible via end-user devices is a shared DA library. Each shared DA library will be stored in cloud-based storage separately from an end-user's personal DA library and may be established as a subscription option for a particular end-user. Once a shared DA library is established by the particular end-user, all participants of the shared DA library will be able to access the shared DA library (but not each respective participant's personal DA library). Establishing shared DA libraries introduces new challenges related to DA move options between personal and shared DA libraries and related efficiency, privacy, and end-user experience issues.

SUMMARY

Methods, computer-readable mediums, end-user devices, and systems related to digital asset (DA) move options between personal and shared DA libraries are described herein. Such move options between a personal DA library and a shared DA library may be performed using a collective knowledge (CK) move application programming interface (API) after the personal DA library and the shared DA library have been established on a cloud-based platform. The personal DA library includes DAs and related DA records, where each of the DA records include a set of fields including a master record of a respective DA. Example move options include: receiving a share DA instruction related to a particular DA in the personal DA library; transferring a first part of the DA record for the particular DA from the personal DA library to the shared DA library, the first part including the master record; and after completion of said transferring, maintaining a second part of the DA record for the particular DA in the personal DA library, the second part not including the master record. In some example embodiments, DAs in the personal DA library and DAs in the shared DA library may be seamlessly displayed together in a DA viewer application of an end-user device related to a participant of the shared DA library. As another option, an end-user may select an option in the DA viewer application to view DAs of the personal DA library separate from DAs of the shared DA library. Each participant of a shared DA library may interact with the shared DA library differently. For example, each participant may keep or update different versions of the DAs in shared DA library in their respective personal DA libraries as desired.

In some example embodiments, the second part of the DA record includes a set of private properties for the particular DA, where the set of private properties are not included with first part of the DA record transferred to the shared DA library. Examples of the private properties include a view-count and a face identification. Also, the second part of the DA record may be updated to include move status information related to transferring the first part of the DA record to the shared DA library. The move status information may be helpful because transferring the first part of the DA record for the particular DA from the personal DA library to shared DA library may include queueing the related transfer until a later time. Until the transfer is completed, the master record of the particular DA in the second part of the DA record may be maintained by the personal DA library. Another DA move option between personal and shared DA libraries includes displaying an intermediate state in the shared DA library before transfer of the first part of the DA record to the shared DA library is complete.

Another move option includes: receiving an unshare request for the particular DA by a participant of the shared DA library; and, in response to the unshare request, initiating transfer of the particular DA from the shared DA library to the requester's personal DA library. Another move option includes: receiving an exit request to exit the shared DA library by an exiting participant of the shared DA library; in response to the exit request, establishing an exit DA library with copies of DAs in the shared DA library; and maintaining the exit DA library until the existing participant completes an exit process. Another move option includes:

receiving a participant exit or removal request related to the shared DA library by a requesting participant of the shared DA library; in response to the participant exit or removal request, obtaining contribution information for DAs in the shared DA library; and performing participant exit or removal operations based on the contribution information related to the requesting participant.

The DA move options involve operations in separate databases. When a DA is shared, sparse DA record operations are performed in the personal DA library and new DA record operations are performed in the shared DA library. When a DA is unshared, the DA record in the shared DA library is marked as expunged and a full DA record replaces the sparse DA record in the personal DA library. As needed, recovery is performed to repeat operations related to one or both databases until a DA move is successful. After a successful move, DA records may be updated to account for the move.

BRIEF DESCRIPTION OF THE DRAWINGS

Embodiments described herein are illustrated by examples and not limitations in the accompanying drawings, in which like references indicate similar features. Furthermore, in the drawings, some conventional details have been omitted, so as not to obscure the inventive concepts described herein.

DETAILED DESCRIPTION

Figure 1:
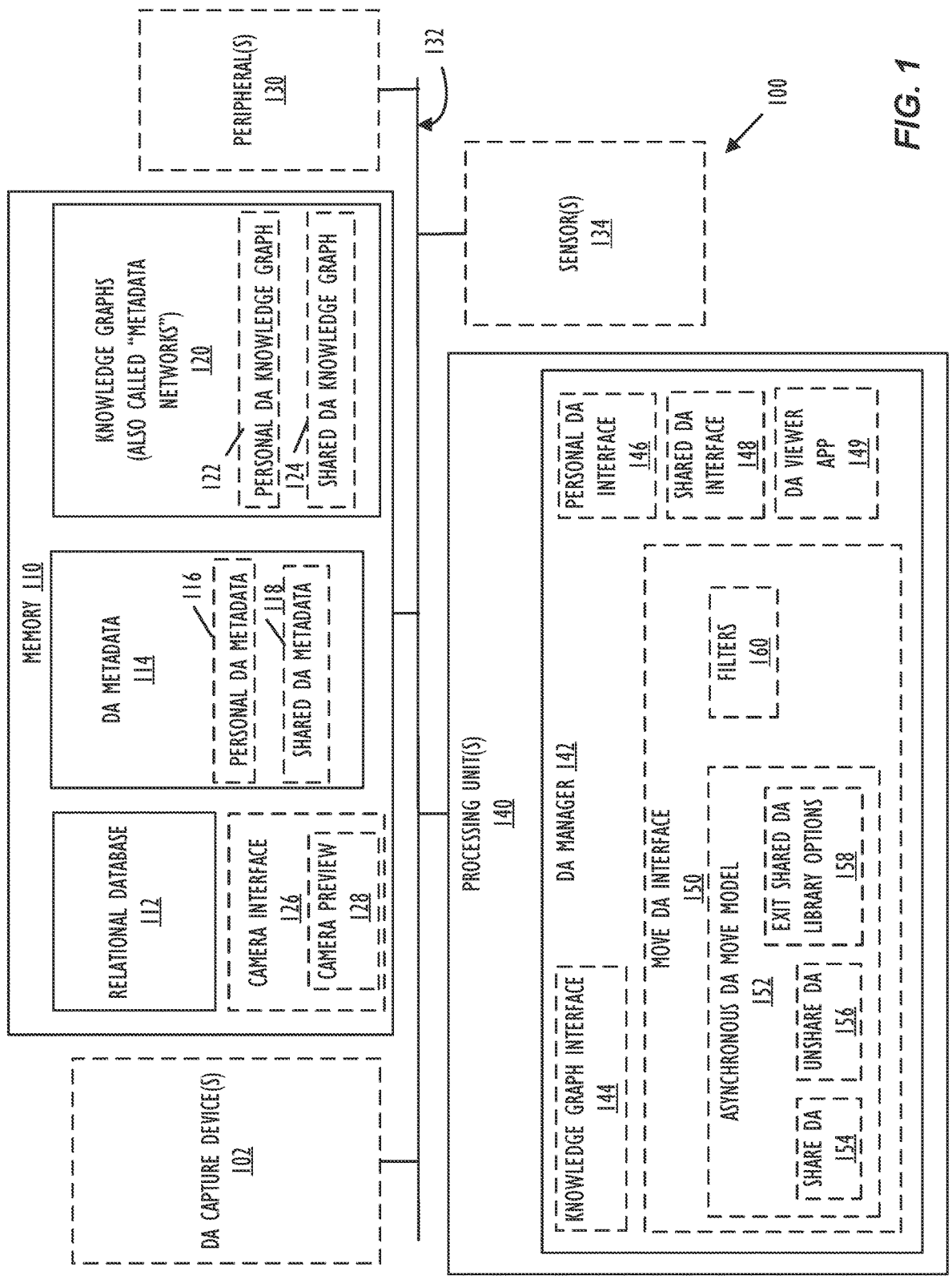
FIG. 1 illustrates, in block diagram form, a digital asset (DA) management system that includes electronic components for performing DA management including DA move options between personal and shared DA libraries in accordance with an embodiment.

Described herein are methods, end-user devices, computer-readable mediums, and systems to provide digital asset (DA) move options between personal and shared DA libraries. The DA move options involve operations in separate databases, where DAs in a personal DA library can be shared or unshared with a shared DA library. When a DA is shared, sparse DA record operations are performed in the personal DA library and new DA record operations are performed in the shared DA library. When a DA is unshared, the DA record in the shared DA library is marked as expunged and a full DA record replaces the sparse DA record in the personal DA library. As needed, recovery is performed to repeat operations related to one or both databases until a DA move is successful. After a successful move, DA records may be updated to account for the move. Other DA move option relate to exit scenarios such as: a participant requesting to exit from a shared DA library; a participant being removed from the shared DA library; or the shared DA library being shut down.

In a cloud-based architecture, records may be designated as either "personal" or "shared," depending on their location across personal and shared DA libraries (sometimes referred to as databases or zones herein). The concept of a user's shared DA library in this system is the federation of all records and state that spans the user's personal DA database and the shared database. In this system, all participants of the shared DA library have their own private databases and access to a single, shared database. Participants do not have cryptographic access to each others' personal DA libraries, but all have equal access to the shared DA library.

To make a DA record shared, the DA record is moved out of a given personal DA library and into the shared DA library. In some example embodiments, a shared DA record can maintain per-participant personal data as well as relationships with DA records in each participant's personal DA library. The cross-database relationships and personal state is maintained via a sparse record in a participant's personal DA library, database, or zone. Participants in a shared DA library can copy or unshare DA records from the shared DA library back to their respective personal DA library, database, or zone. In such case, the shared DA record and corresponding sparse records are merged in the participant's personal DA library.

The DA move options described herein are based on an "eventually consistent move" model, which is asynchronous and distinguishable from conventional move operations in that: 1) origin and destination zones are not guaranteed to update at the same time; 2) the client (e.g., end-user device) is relied upon to interpret mid-move state with duplicate records; 3) the move may be interpreted as a success if the destination record is written; 4) no rollback; 5) no locking; and 6) origin writes may be blocked mid-move.

With the DA move options, DA content is transferred from a personal DA library to a shared DA library or vice versa. As needed, some queueing of DA move operations can be performed. Also, some quality filters and/or duplication prevention filters may be applied to avoid DA moves that overpopulate the shared DA library with DAs that fall below a quality metric (e.g., blurry, bad lighting, duplicate, file type, etc.). Once a shared DA library is populated or updated, the DAs are available to all participants of the shared DA library. In some example embodiments, the shared DA library is a subscription option available on a cloud-based platform. In different example embodiments, an end-user may have a single shared DA library or multiple DA libraries. For each shared DA library, the amount of total storage available for the shared DA library may vary.

Once DA sharing or unsharing is initiated, asynchronous DA move operations are performed as described herein. On each end-user device, a DA viewer application may present respective personal DAs and shared DAs together or separately. Each participant may have their own edited copies or versions of personal DAs and/or shared DAs available via the DA viewer application. Also, each participant may have their own Moments or Memories that combine their respective personal DAs with shared DAs.

Terminology

In order to enhance understanding of this disclosure and the various embodiments discussed, non-limiting explanations of various terms used in this disclosure are provided below.

Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

The term "digital asset" (DA) refers to data/information which is bundled or grouped in such a way as to be meaningfully rendered by a computational device for viewing, reading, and/or listening by a person or other computational device/machine/electronic device. Digital assets can include photos, recordings, and data objects (or simply "objects"), as well as video files and audio files. Image data related to photos, recordings, data objects, and/or video files can include information or data necessary to enable an electronic device to display or render images (such as photos) and videos. Audiovisual data can include information or data necessary to enable an electronic device to present videos and content having a visual and/or auditory component.

The term "primary DAs" refers to DAs captured using native sensors (e.g., cameras, microphone, etc.) of an end-user device, external sensors coupled to the end-user device (e.g., an external web camera, specialty camera, etc.), or DAs obtained from trusted sources associated with the user (e.g., the DA library of the user's cloud account; the DA library of the user's computer, laptop, or other display device; direct imports from cameras, memory cards, scanners or other devices; imports from end-user devices that are previously identified as a trusted source by a user; and/or any other trusted sources).

The term "secondary DAs" refers to DAs captured by another end-user device and received later by a given end-user device (e.g., via a wired or wireless communication interface). Secondary DAs may alternatively be termed "external DAs" or "guest DAs". Secondary DAs are received by the end-user device from other users' devices via a wired or wireless communication interface, or from other secondary sources (e.g., any application on the end-user device which can receive DAs; the DA library of another user's end-user device; imports from end-user devices that are not previously identified as a trusted source by a user).

The term "personal DAs" refers to DAs stored in an end-user's personal DA library regardless of source.

The term "shared DAs" refers to DAs stored in a participant's shared DA library regardless of source.

The term "DA management" refers to methods and procedures for managing DAs. A DA management system is thus a system for managing DAs.

The term "personal DA library" refers to a user interface for interacting with personal DAs including photos, videos, enhanced photos (e.g., Apple's Live Photos), or other DAs. As an example, a personal DA library may provide a variety of query, organization, and featured DA options for primary DAs by default. Secondary DAs become linked to the primary DA library after a syndication process subject to eligibility filters. In different scenario, DAs in the personal DA library may be stored locally, at a server, or a combination thereof. In some scenarios, users with a DA library "cloud storage" option turned on for their user account may have most of the high/full-resolution versions of their personal DA library stored in cloud storage, while lower resolution thumbnail versions of the images are stored locally on the end-user device by default unless or until a higher-resolution version of such images are requested by the end-user's device. For example, as a user scrolls through or accesses certain photos, the full-resolution versions of the DAs can be being downloaded in the background, so that, when a user clicks on the thumbnail, the full-resolution versions of the DAs appear.

The term "shared DA library" refers to a user interface for interacting with shared DAs including photos, videos, enhanced photos (e.g., Apple's Live Photos), or other DAs. As an example, a shared DA library may provide a variety of query, organization, and featured DA options. In different scenario, DAs in the shared DA library may be stored locally, at a server, or a combination thereof. In some scenarios, users with a DA library "cloud storage" option turned on for their user account may have most of the high/full-resolution versions of their personal DA library stored in cloud storage, while lower resolution thumbnail versions of the images are stored locally on the end-user device by default unless or until a higher-resolution version of such images are requested by the end-user's device. For example, as a user scrolls through or accesses certain photos, the full-resolution versions of the photos can be being downloaded in the background, so that, when a user clicks on the thumbnail, the full-resolution versions of the photos appear.

The term "syndication library" refers to a DA interface separate from the personal DA library or shared DA library. The syndication library stores secondary DAs, which are subject to eligibility filters before becoming linked with a personal DA library.

The term "change," when used as a verb, refers to: making the form, nature, content, future course, etc., of (something) different from what it is or from what it would be if left alone; transforming or converting; and substituting another or others. "Change" includes becoming different, altered and/or modified. When used as a noun, "change" includes the act or fact of changing; fact of being changed; a transformation or modification; alteration; a variation or deviation.

The term "detect" means to notice, note, identify by a computational device such as by one or more processors, either mediately (e.g., via one or more coupled sensors, other devices) or immediately. For example, a system can detect that information in a database has been changed (e.g., updated, revised, altered, or overwritten).

The term "data" refers to information which can be stored by a computer memory. Digital data can be notionally grouped with other digital data to form a DA. Data can include media assets and "image data."

The term "data object" can be a variable, a data structure, a function, or a method, and a value in computer-readable memory referenced by an identifier. "Data object" or just "object" can refer to a particular instance of a class, where the object can be a combination of variables, functions, and data structures. An object can be a table or column, or an association between data and a database entity (such as relating a person's age to a specific person); an object can thus be a constellation of data describing, for example, a person or an event, or series of events.

The term "computational intensity" refers to the number of computations and/or the amount of time required to perform one or more operations. An operation can be computationally intense or computationally expensive when it would take a relatively large amount of time and/or large number of calculations or computations to carry out the operation.

The expression "modifying information" includes changing, deleting, adding and moving information or data within data storage units, such as databases and computer memory.

The term "electronic device," (or simply "device") includes servers, mobile electronic devices such as smart phones, laptop computers, personal computers and tablet computers. These mobile electronic devices are examples of end-user devices.

The term "coupled" refers to components or devices which are able communicate or interact with one another, either directly or indirectly. All connected elements are coupled, but not all coupled elements are connected. Coupled elements include those which are able to communicate with each other.

The terms "determine" and "determination" include, by way of example, calculations, evaluations, ascertainments, confirmations and computations, as well as computations/calculations necessary to make an evaluation, confirmation, ascertainment, or discernment, performed by a computing device, such as a processor. Thus, for example, making a determination as to whether to translate a change in data into one or more modification instructions will involve one or more computations and/or calculations.

The term "knowledge graph" (also called "metadata network") refers to a data structure with nodes and edges. "Node" is a synonym for "vertex." Vertices of graphs are often considered to be atomistic objects, with no internal structure. An edge is (together with vertices) one of the two basic units out of which graphs are constructed. Each edge has two (or in hypergraphs, more) vertices to which it is attached, called its endpoints. Edges may be directed or undirected; undirected edges are also called lines and directed edges are also called arcs or arrows. In an undirected simple graph, an edge may be represented as the set of its vertices, and in a directed simple graph it may be represented as an ordered pair of its vertices. An edge that connects vertices x and y is sometimes written xy.

A knowledge graph according to this disclosure can be a graph database. A graph database is a database that uses graph structures for semantic queries with nodes, edges and properties to represent and store data. A key concept of the system is the graph (or edge or relationship), which directly relates data items in a store, (such a relational database). The relationships allow data in the store to be linked together directly, and in many cases retrieved with one operation. Graph databases are based on graph theory, and employ nodes and edges. Graph databases enable simple and fast retrieval of complex hierarchical structures that are difficult to model in relational systems. A knowledge graph allows data elements to be categorized for large scale easy retrieval.

Within the knowledge graph, "nodes" represent entities such as people, businesses, accounts, events, locations or any other item to be tracked. "Edges," also termed graphs or relationships, connect nodes to other nodes. Edges represent a relationship between nodes. Meaningful patterns emerge when examining the connections and interconnections of nodes, properties, and edges. Edges are key to the knowledge graph, as they represent an abstraction that is not directly implemented in other systems, such a relational database. A change a relational database can necessitate the need to add, delete, or modify one or more nodes and edges in a related knowledge graph. For the described DA management systems, one or more knowledge graphs may be used before, during, and after smart sharing operations to handle primary DA, secondary DA, personal DA, and shared DA management options.

The term "cloud-based platform" refers to a combination of network devices that together provide client devices with access to online storage, online applications, and/or online processing utilities. With a cloud-based platform, the online storage, online application, and/or online computing may be available via a login process and may be based on a subscription. While not necessarily required, cryptography may be used with a cloud-based platform to ensure data stored on the network devices related to cloud-based platform is only available to the client device (which may hold the encryption/decryption keys).

The term "relational database" refers to databases that gather data together using information in the data. Relational databases do not inherently contain the idea of fixed relationships between data items, (also called "records"). Instead, related data is linked to each other by storing one record's unique key in another record's data. A relational system may have to search through multiple tables and indexes, gather large amounts of information, and then sort the information to cross-reference data items. In contrast, graph databases directly store the relationships between records.

Embodiments set forth herein support DA move options between different libraries (e.g., a personal DA library and a shared DA library) hosted by a cloud-based platform. Some embodiments of this disclosure are based in object-oriented programming (OOP). OOP refers to a programming paradigm based on the concept of "objects," which may contain data, in the form of fields, often known as attributes. Objects can contain code, in the form of procedures, often known as methods. A feature of objects is that an object's procedures can access and often modify the data fields of the object with which they are. Within OOP schema, a type is a category. A type is an object with a size, a state, and a set of abilities. Types are defined in order to model a problem to be solved. A class is a definition of a new type, that is, types are made by declaring a class. A class is a collection of variables combined with a set of related functions. Other classes and functions can use a class. Member variables are variables in a class. OOP languages can be class-based, meaning that objects are individual instances of classes, which typically also determine their type.

Substantial computational resources may be needed to manage the DAs in a DA collection (e.g., processing power for performing queries or transactions, computer-readable memory space for storing the necessary databases, etc.). Due to limited storage capacity, DA management for an end-user device may be provided by a remote device (e.g., an external data store, an external server, etc.), where copies of the DAs are stored, and the results are transmitted back to the end-user device having limited storage capacity.

Thus, according to some DA management embodiments, a "knowledge graph" (also referred to herein as a "metadata network") associated with a collection of digital assets (i.e., a DA collection) is used. The knowledge graph can comprise correlated "metadata assets" describing characteristics associated with DAs. Each metadata asset can describe a characteristic associated with one or more digital DAs in the DA collection. For example, a metadata asset can describe a characteristic associated with multiple DAs in the DA collection, such as the location, day of week, event type, etc., of the one or more associated DAs. Each metadata asset can be represented as a node in the metadata network. A metadata asset can be correlated with at least one other metadata asset. As noted above, correlations between metadata assets can be represented as an edge in the metadata network that is between the nodes representing the correlated metadata assets. According to some embodiments, a knowledge graph may define multiple types of nodes and edges, e.g., each with their own properties, based on the needs of a given implementation.

FIG. 1 illustrates, in block diagram form, a DA management system 100 that includes electronic components for performing DA management including DA move options between personal and shared DA libraries in accordance with one or more embodiments described in this disclosure. The system 100 can be housed in single end-user device, such as a desktop computer system, a laptop computer system, a tablet computer system, a server computer system, a mobile phone, a media player, a personal digital assistant (PDA), a personal communicator, a gaming device, a network router or hub, a wireless access point (AP) or repeater, a set-top box, or a combination thereof. Components in the system 100 can be spatially separated and implemented on separate computing systems that are connected by the communication mechanism 132, as described in further detail below.

For one embodiment, the system 100 may include processing unit(s) 140, computer-readable memory 110, DA capture devices) 102, sensor(s) 134, and peripheral(s) 130. For one embodiment, one or more components in the system 100 may be implemented as one or more integrated circuits (ICs). For example, at least one of the processing unit(s) 140, the communication mechanism 132, the DA capture devices) 102, the peripheral(s) 130, the sensor(s) 134, or the computer-readable memory 110 can be implemented as a system-on-a-chip (SoC) IC, a three-dimensional (3D) IC, any other known IC, or any known IC combination. For another embodiment, two or more components in the system 100 are implemented together as one or more ICs. For example, at least two of the processing unit(s) 140, the communication mechanism 132, the DA capture devices) 102, the peripheral(s) 130, the sensor(s) 134, or the computer-readable memory 110 are implemented together as a SoC IC. Each component of system 100 is described below.

As shown in FIG. 1, the system 100 can include processing unit(s) 140, such as CPUs, GPUs, other integrated circuits (ICs), computer memory, and/or other electronic circuitry. For one embodiment, the processing unit(s) 140 manipulate and/or process DA metadata 114 associated with DAs or optional data associated with DAs (e.g., data objects reflecting one or more persons, places, and/or events associated with a given DA, etc.). The processing unit(s) 140 may include a DA manager 142 for performing one or more embodiments of DA management, as described herein. For one embodiment, the DA manager 142 is implemented as hardware (e.g., electronic circuitry associated with the processing unit(s) 140, circuitry, dedicated logic, etc.), software (e.g., one or more instructions associated with a computer program executed by the processing unit(s) 140, software run on a general-purpose computer system or a dedicated machine, etc.), or a combination thereof.

The DA manager 142 can enable the system 100 to generate and use knowledge graphs 120 of the DA metadata 114 as a multidimensional network. Knowledge graphs 120 and multidimensional networks that may be used to implement the various techniques described herein are described in further detail in U.S. Non-Provisional patent application Ser. No. 15/391,269, entitled "Notable Moments in a Collection of Digital Assets," filed Dec. 27, 2016, and hereby incorporated by reference herein.

In one embodiment, the DA manager 142 can perform one or more of the following operations: (i) generate the knowledge graphs 120; (ii) relate and/or present at least two DAs, e.g., as part of a moment, based on the knowledge graphs 120; (iii) determine and/or present interesting DAs in the DA collection to the user as sharing suggestions, based on the knowledge graphs 120 and one or more other criterion; (iv) select and/or present suggested DAs to share with one or more third parties (e.g., based on a contextual analysis); and select and/or present DAs for linkage or inclusion with a shared DA library.

Over time, the DA manager 142 obtains or receives a collection of DA metadata 114 including personal DA metadata 116 and shared DA metadata 118. The personal DA metadata 116 and the shared DA metadata 118 may be stored separately at least initially. The related storage locations may be spatially or logically separated as is known. As used herein, "metadata," "digital asset metadata," "DA metadata," and their variations collectively refer to information about one or more DAs. Metadata can be: (i) a single instance of information about digitalized data (e.g., a time stamp associated with one or more images, etc.); or (ii) a grouping of metadata, which refers to a group comprised of multiple instances of information about digitalized data (e.g., several time stamps associated with one or more images, etc.). There may also be many different types of metadata associated with a collection of DAs. Each type of metadata (also referred to as "metadata type") describes one or more characteristics or attributes associated with one or more DAs. Further detail regarding the various types of metadata that may be stored in a DA collection and/or utilized in conjunction with a knowledge graphs are described in further detail in U.S. Non-Provisional patent application Ser. No. 15/391,269, which was incorporated by reference above.

As used herein, "context" and its variations refer to any or all attributes of a user's device that includes or has access to a DA collection associated with the user, such as physical, logical, social, and other contextual information. As used herein, "contextual information" and its variations refer to metadata that describes or defines a user's context or a context of a user's device that includes or has access to a DA collection associated with the user. Exemplary contextual information includes, but is not limited to, the following: a predetermined time interval; an event scheduled to occur in a predetermined time interval; a geolocation visited during a particular time interval; one or more identified persons associated with a particular time interval; an event taking place during a particular time interval, or a geolocation visited during a particular time interval; weather metadata describing weather associated with a particular period in time (e.g., rain, snow, sun, temperature, etc.); season metadata describing a season associated with the capture of one or more DAs; relationship information describing the nature of the social relationship between a user and one or more third parties; or natural language processing (NLP) information describing the nature and/or content of an interaction between a user and one more third parties. For some embodiments, the contextual information can be obtained from external sources, e.g., a social networking application, a weather application, a calendar application, an address book application, any other type of application, or from any type of data store accessible via a wired or wireless network (e.g., the Internet, a private intranet, etc.).

Referring again to FIG. 1, for one embodiment, the DA manager 142 uses the DA metadata 114 to generate knowledge graphs 120. As shown in FIG. 1, all or some of the knowledge graphs 120 can be stored in the processing unit(s) 140 and/or the computer-readable memory 110. The knowledge graphs 120 include a personal DA knowledge graph 122 and a shared DA knowledge graph 124. Each of the personal DA knowledge graph 122 and the secondary DA knowledge graph 124 includes dynamically organized collections of metadata describing one or more DAs (e.g., one or more groups of DAs in a DA collection, one or more DAs in a DA collection, etc.) used by one or more computer systems. In the knowledge graphs 120, there are no actual DAs stored—only metadata (e.g., metadata associated with one or more groups of DAs, metadata associated with one or more DAs, etc.). The knowledge graphs 120, differ from databases because, in general, knowledge graphs 120 enable deep connections between metadata using multiple dimensions, which can be traversed for additionally deduced correlations. This deductive reasoning generally is not feasible in a conventional relational database without loading a significant number of database tables (e.g., hundreds, thousands, etc.). Compared to conventional databases, the knowledge graphs 120 may be viewed, operated, and/or stored using fewer computational resources. Furthermore, the knowledge graphs 120 are dynamic resources that have the capacity to learn, grow, and adapt as new information is added to them. This is unlike databases, which are useful for accessing cross-referred information. While a database can be expanded with additional information, the database remains an instrument for accessing the cross-referred information that was put into it. The knowledge graphs 120 do more than access cross-referenced information—they go beyond that and involve the extrapolation of data for inferring or determining additional data. As alluded to above, the DAs themselves may be stored, e.g., on one or more servers remote to the system 100, with thumbnail versions of the DAs stored in the computer-readable memory 110 and full versions of particular DAs only downloaded and/or stored to the computer-readable memory 110 as needed (e.g., when the user desires to view or share a particular DA). In other embodiments, however, e.g., when the amount of onboard storage space and processing resources of the system 100 is sufficiently large and/or the size of the user's DA collection is sufficiently small, the DAs themselves may also be stored within computer-readable memory 110, e.g., in a separate database, such as in one or more relational databases.

The DA manager 142 may generate the knowledge graphs 120 as a multidimensional network of the DA metadata 114. As used herein, a "multidimensional network" and its variations refer to a complex graph having multiple kinds of relationships. A multidimensional network generally includes multiple nodes and edges. For one embodiment, the nodes represent metadata, and the edges represent relationships or correlations between the metadata. Exemplary multidimensional networks include, but are not limited to, edge-labeled multigraphs, multipartite edge-labeled multigraphs, and multilayer networks.

In one embodiment, the knowledge graphs 120 includes two types of nodes—(i) moment nodes; and (ii) non-moments nodes. As used herein, a "moment" refers a single event (as described by an event metadata asset) that is associated with one or more DAs. For example, a moment may refer to a visit to coffee shop in Cupertino, California that took place on Mar. 26, 2018. In this example, the moment can be used to identify one or more DAs (e.g., one image, a group of images, a video, a group of videos, etc.) associated with the visit to the coffee shop on Mar. 26, 2018 (and not with any other event).

As used herein, a "moment node" refers to a node in a multidimensional network that represents a moment (as is described above). As used herein, a "non-moment node" refers a node in a multidimensional network that does not represent a moment. Thus, a non-moment node may refer to a metadata asset associated with one or more DAs that is not a moment (i.e., not an event metadata asset).

For one embodiment, the edges in the knowledge graphs 120 between nodes represent relationships or correlations between the nodes. For one embodiment, the DA manager 142 updates the knowledge graphs 120 as it obtains or receives new DA metadata 114 and/or determines new DA metadata 114 for the DAs in the end-user's DA collection.

The DA manager 142 can manage DAs associated with the DA metadata 114 using the knowledge graphs 120 in various ways. In some example embodiments, the DA manager 142 may include a knowledge graph interface 144, a personal DA interface 146, and a shared DA interface 148, and a DA viewer application 149 configured to leverage the knowledge graphs 120 to identify and present interesting groups of one or more DAs in a DA collection based on the correlations (i.e., the edges in the knowledge graphs 120) between the DA metadata 114 (i.e., the nodes in the knowledge graphs 120) and one or more criterion. For this first example, the DA manager 142 may select the interesting DAs based on moment nodes in the knowledge graphs 120. In some embodiments, the DA manager 142 may suggest that a user shares the one or more identified DAs with one or more third parties. For a second example, the DA manager 142 may use the knowledge graphs 120 and other contextual information gathered from the system (e.g., the user's relationship to one or more third parties, a topic of conversation in a messaging thread, an inferred intent to share DAs related to one or moments, etc.) to select and present a representative group of one or more DAs that the user may want to share with one or more third parties.

In some example embodiments, the various options related to the knowledge graphs 120 vary for the personal DA knowledge graph 122 versus the shared DA knowledge graph 124. Specifically, the personal DA interface 146 of the DA manager 142 is configured to use the personal DA knowledge graph 122 for operations related to the personal DA library. In contrast, the shared DA interface 148 of the DA manager 142 is configured to use the shared DA knowledge graph 124 for operations related to the shared DA library.

As shown, the DA manager 142 also includes a move DA interface 150 configured to manage DA moves between a personal DA library and a shared DA library. In the example of FIG. 1, the move DA interface 150 includes an asynchronous DA move model and filters 160. The filters 160 prevent DA moves from being initiated or completed to avoid populating the shared DA library with DAs having a quality metric (e.g., blurry, dark, duplicate, file type, etc.) below a threshold. The asynchronous DA move model 152 is used to manage DA moves as needed based on share DA instructions 154, unshare DA instructions 156, and exit shared DA library options 158.

In some example embodiments, the asynchronous DA move model 152 involves a collective knowledge (CK) application programming interface (API) to support DA shares and DA unshares (using the share DA instructions 154 and the unshare DA instructions 156). In response to a DA share request or event, one or more DA records (or partial DA records) in a personal DA library are moved into from the personal DA library to a shared DA library accessible to all participants. In response to a DA unshare request or event, one or more DA records (or partial DA records) in the shared DA library are moved back to a respective personal DA library. In some example embodiments, an unshare request or event limits access of the unshared DA to only the requester.

In some example embodiments, the asynchronous DA move model 152 supports a federated sync of full library scope (both personal and shared DAs together). The full library scope may include: private photos+photos shared by me+photos shared to me. Each personal DA library and each shared DA library may be a state silo. As an option, personal data may be stored on the share and personal library state is not manipulated on any shared action without an automatic dedupe. In some example embodiments, the asynchronous DA move model 152 enables different DA libraries to be set up on different devices. In such case, end-user devices (clients) may sync to either DA library without the other. In one example, a client may sync different devices to a personal DA library and/or a shared DA library.

In some example embodiments, the asynchronous DA move model 152 supports a legacy operating system (OS), which may continue to sync to a personal DA library. As another option, a server may sync move tombstones down to legacy clients as regular delete tombstones (which a client has existing resolution workflows for). As another option, local dedupe of all participants' personal DA library is performed against shared library on the client. As another option, cross-relational entities (e.g., Albums, Memories, etc.) may hold DAs moved to the share or photos shared to me. In some example embodiments, the asynchronous DA move model 152 supports personalized fields on shared DA records. For example, each participant may hold unique, personal values for shared DA records for fields like favorites, faces, view/share/playcounts, etc.

In some example embodiments, the asynchronous DA move model 152 supports bulk copy on participant exit from a shared DA library. When leaving a share DA library, users may copy all DAs, contributed DAs, or no DAs out of the shared DA library without affecting access for remaining participants. In some example embodiments, the asynchronous DA move model 152 supports shared ownership of a shared DA library. In such case, the shared DA library is not tied to a specific owner's participation. In some embodiments, the asynchronous DA move model 152 supports quotas on DA shares. For example, shared DAs may be charged to the owner of a shared DA library (e.g., the owner may be the person who created the shared DA library). Note: participants in the shared DA library are not limited to a particular DA viewer application.

In some example embodiments, the asynchronous DA move model 152 supports automatic deduplication of shared DAs. Other quota options include charging to any participant of a shared DA library or charging equally amongst participants of a shared DA library. As another option, the ownership of a shared DA library may be transferred. Additional details or options for the asynchronous DA move model 152 and related operations are given in FIGS. 6, 7, 8, 9A, 9B, and 10.

Over time, DAs may be linked to the shared DA library, resulting in updates to the personal DA knowledge graph 112 and the shared DA knowledge graph 124. Depending on the circumstances (battery level, wireless channel condition, the number of DAs to be added to the shared DA library, etc.), the shared DA library is populated more quickly or less quickly with new DAs. Once the shared DA library is populated and related links are complete, the DAs in the shared DA library may be available for query, organization, and featured DA options of the shared DA library.

In some example embodiments, the personal DA library of the end-user sharing DAs to the shared DA library does not see a difference in their personal DA library even through some DAs displayed in the end-user's personal DA library will be stored separately in cloud-based storage for the shared DA library rather than cloud-based storage for the personal DA library. To organize and feature DAs of the personal DA library and/or the shared DA library, updated knowledge graphs or linked knowledge graphs may be used.

As shown, the computer-readable memory 110 may store and/or retrieve DA metadata 114, the knowledge graphs 120, and/or optional data described by or associated with the DA metadata 114. The DA metadata 114, the knowledge graphs 120, and/or the optional data can be generated, processed, and/or captured by the other components in the system 100. For example, the DA metadata 114, the knowledge graphs 120, and/or the optional data may include data generated by, captured by, processed by, or associated with one or more peripherals 130, the DA capture device(s) 102, or the processing unit(s) 140, etc. The system 100 can also include a memory controller (not shown), which includes at least one electronic circuit that manages data flowing to and/or from the computer-readable memory 110. The memory controller can be a separate processing unit or integrated in processing unit(s) 140.

In some example embodiments, the DA capture device(s) 102 is an imaging device for capturing images, an audio device for capturing sounds, a multimedia device for capturing audio and video, any other known DA capture device. The DA capture device(s) 102 is illustrated with a dashed box to show that it is an optional component of the system 100. In one embodiment, the DA capture device (s) 102 can also include a signal processing pipeline that is implemented as hardware, software, or a combination thereof. The signal processing pipeline can perform one or more operations on data received from one or more components in the DA capture devices) 102. The signal processing pipeline can also provide processed data to the computer-readable memory 110, the peripheral(s) 130 (as discussed further below), and/or the processing unit(s) 140.

The peripheral(s) 130 can include at least one of the following: (i) one or more input devices that interact with or send data to one or more components in the system 100 (e.g., mouse, keyboards, etc.); (ii) one or more output devices that provide output from one or more components in the system 100 (e.g., monitors, printers, display devices, etc.); or (iii) one or more storage devices that store data in addition to the computer-readable memory 110. Peripheral(s) 130 is illustrated with a dashed box to show that it is an optional component of the system 100. The peripheral(s) 130 may also refer to a single component or device that can be used both as an input and output device (e.g., a touch screen, etc.). The system 100 may include at least one peripheral control circuit (not shown) for the peripheral(s) 130. The peripheral control circuit can be a controller (e.g., a chip, an expansion card, or a stand-alone device, etc.) that interfaces with and is used to direct operation(s) performed by the peripheral(s) 130. The peripheral(s) controller can be a separate processing unit or integrated in processing unit(s) 140. The peripheral(s) 130 can also be referred to as input/output (I/O) devices throughout this document.

As shown, the system 100 also include one or more sensors 134, which are illustrated with a dashed box to show that the sensors 130 are optional components of the system 100. For one embodiment, the sensor(s) 130 can detect a characteristic of one or more environs. Examples of a sensor include, but are not limited to: a light sensor, an imaging sensor, an accelerometer, a sound sensor, a barometric sensor, a proximity sensor, a vibration sensor, a gyroscopic sensor, a compass, a barometer, a heat sensor, a rotation sensor, a velocity sensor, and an inclinometer.

In the example of FIG. 1, the system 100 includes a communication mechanism 132. The communication mechanism 132 can be, e.g., a bus, a network, or a switch. When the communication mechanism 132 is a bus, the communication mechanism 132 transfers data between components in system 100, or between components in system 100 and other components associated with other systems (not shown). As a bus, the communication mechanism 132 includes all related hardware components (wire, optical fiber, etc.) and/or software, including communication protocols. For one embodiment, the communication mechanism 132 can include an internal bus and/or an external bus. Moreover, the communication mechanism 132 can include a control bus, an address bus, and/or a data bus for communications associated with the system 100. For one embodiment, the communication mechanism 132 can be a network or a switch. As a network, the communication mechanism 132 may be any network such as a local area network (LAN), a wide area network (WAN) such as the Internet, a fiber network, a storage network, or a combination thereof, wired or wireless. When the communication mechanism 132 is a network, the components in the system 100 do not have to be physically co-located. When the communication mechanism 132 is a switch (e.g., a "cross-bar" switch), separate components in system 100 may be linked directly over a network even though these components may not be physically located next to each other. For example, two or more of the processing unit(s) 140, the communication mechanism 132, the computer-readable memory 110, the peripheral(s) 130, the sensor(s) 134, and the DA capture device 102 are in distinct physical locations from each other and are communicatively coupled via the communication mechanism 132, which is a network or a switch that directly links these components over a network.

Figure 2:
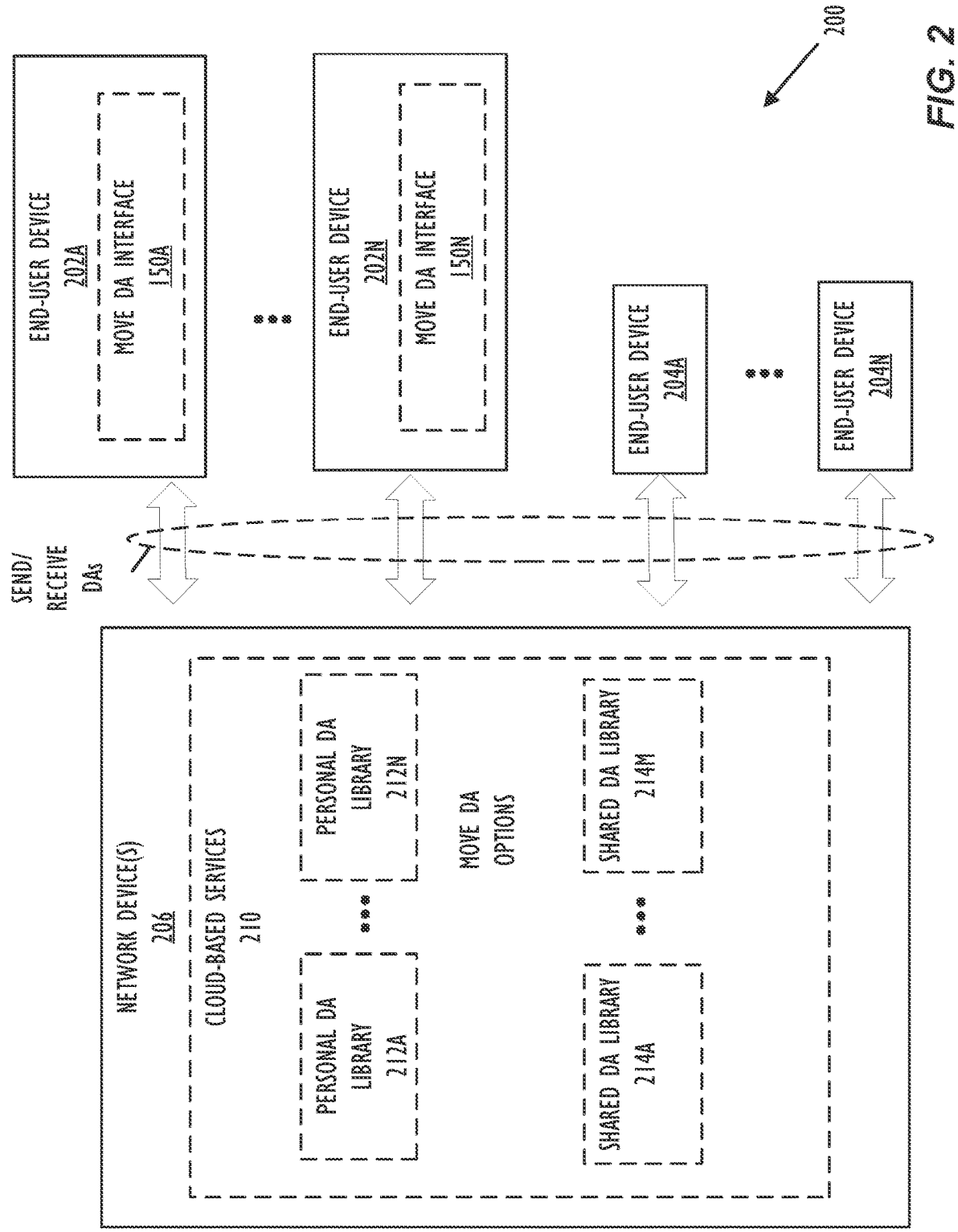
FIG. 2 illustrates, in block diagram form, a system with networked end-user devices in accordance with an embodiment.

FIG. 2 illustrates, in block diagram form, a system 200 with networked end-user devices in accordance with an embodiment. In the system 200, the end-user devices 202A-202N include respective move DA interfaces 150A-150N (examples of the move DA interface 150 in FIG. 1), and may include a DA management system (e.g., the DA management system 100 in FIG. 1). The system 200 may also include end-user devices 204A-204N without DA managers or with legacy DA managers that lack a move DA interface as described herein. In the system 200, DAs may be sent and received between the end-user devices 202A-202N and 204A-204N via network device(s) 206 and respective messaging applications. The network device(s) 206 include wired and/or wireless communication interfaces. In some example embodiments, the network device(s) 206 provide cloud storage and/or computing options for the end-user devices 202A-202N and 204A-204N, including storage of personal DA libraries 212A-212N and shared DA libraries 214A-214M. The personal DA libraries 212A-212N may be provided for particular end-user devices (e.g., the end-user devices 202A-202N) and/or are available via subscription. Similarly, the shared DA libraries 214A-214N may be provided for particular end-user devices (e.g., the end-user devices 202A-202N) and/or are available via subscription. Over time, the number of DAs stored by each of the end-user device 202A-202N and 204A-204N generally increases as more DAs are captured by each respective end-user device or are obtained from other end-user devices) or the network device (s). Some of the DAs will be more meaningful to the share or unshare options, while others are less meaningful. In the end-user devices 204A-204N, participation in shared DA libraries may be unavailable or limited without installation of an additional application. In contrast, the end-user devices 202A-202N with respective move DA interfaces 150A-150N perform DA move operations as described herein.

Figure 3:
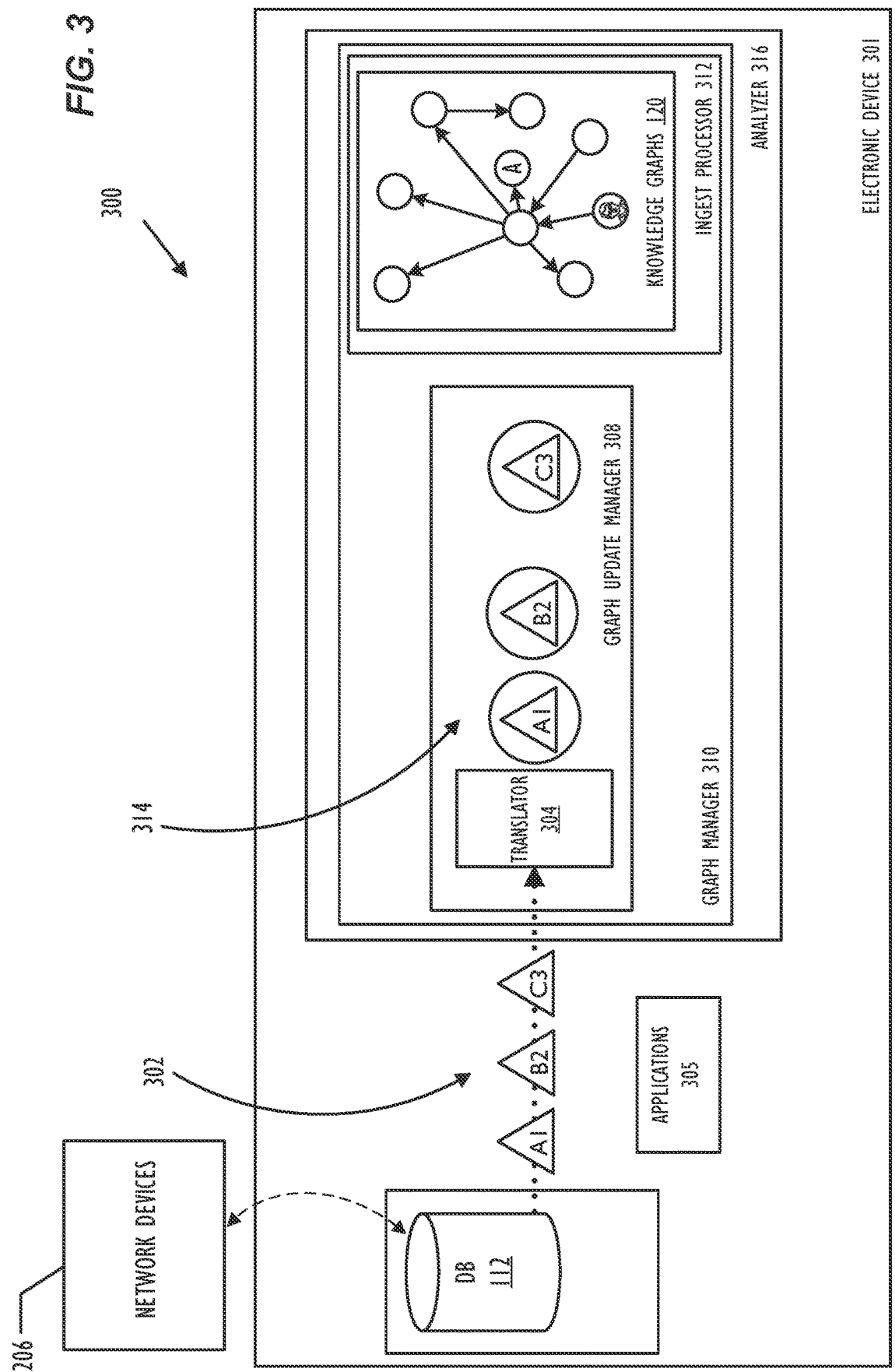
FIG. 3 illustrates, in block diagram form, a knowledge graph update architecture, in accordance with an embodiment.

FIG. 3 illustrates an architecture 300 for updating knowledge graphs 120 by a DA management system (e.g., the DA management system 100 in FIG. 1) based on changes in a relational database 112. In the example of FIG. 3, the architecture 300 includes an electronic device 301 (e.g., one of the end-user devices 202A-202N with respective DA managers 106A-106N) in communication with network devices) 206. In some example embodiments, with the architecture 300, the knowledge graphs 120 are updated periodically (e.g., a twenty-four hour cycle) with changes in the relational database being considered in series. Updating in this manner can involve making changes to knowledge graphs 120 that do not need to be made immediately, such as updates to an event node due to a change in the relational database 112. It is also possible to attempt to update knowledge graphs 120 every time a change is made to the relational database 112. However, in many cases it can be preferable to consider a batch or group of change notifications 302 from the relational database 112 collectively. Doing so can, as explained in greater detail below, enable a DA processing system to ignore changes (e.g., B2) which are, for example, redundant in light of a subsequent change (e.g., A1). This functionality is provided by the translator 304. The translator 304 is a translational layer of a DA management system. The manner in which the translator 304 chooses updates is encoded in code and executed by one or more processing units 140.

As noted previously, knowledge graphs 120 responds to updates, modifications, and changes that occur in the relational database 112. The relational database 112 is thus separate from the knowledge graphs 120. The relational database 112 supports functionality of various native applications 305 (such as a photos application) as well as second-party and third-party applications. All of the asset data is maintained in the relational database 112. Changes in the data stored by the relational database 112 can be brought about by interactions with the applications 305 and with the network devices) 206 (e.g., supporting data transfers between end-user devices, cloud storage/computing options, etc.). The knowledge graphs 120 can often respond in real time to changes in the relational database 112. This real-time responsiveness is enabled, in part, by culling changes in the relational database 112 which do not necessitate a modification, change, or update within the knowledge graphs 120. The translator 304 can also manage the situation in which change (e.g., C3) is currently being implemented and additional change notifications (e.g., A1 and B2) are received by the graph update manager 308. Such changes are buffered and be processed in batches. Buffering change notifications and separating the redundant and/or cumulative and/or irrelevant changes reduces the computational intensity to implement such changes in the knowledge graph 120 than would otherwise by the case.

The better management of relational database 112 provides a finer grain data stream, which makes it possible to be more circumspect or targeted as to what changes will be translated into updates by the translator 304. The translator 304 component of the graph manager 310 can identify certain changes that come from the relational database 112 that are not relevant to the knowledge graphs 120. For example, in one embodiment the knowledge graphs 120 does not track 'albums' data objects used by a photos application (e.g., one of the applications 305) and stored by the relational database 112.

The translator 304 can also make distinctions at a property level (fields within an object). For example, the translator translates changes to certain media assets, but not all changes to those media assets. For example, there can be states that relational database 112 needs in order to keep track of assets, but that have no bearing on the nodes and edges of the knowledge graph 120. The translator 304 can note the properties of an object that have changed and determine whether those properties could affect changes in the nodes or edges in the knowledge graphs 120, and thereby only translate those property changes which would do so. This is an example of the translator 304 making a determination as to whether change(s) in a relational database which are detected warrant making corresponding modifications to information in one or more graph networks. Another example of when a change would not warrant an update is when a subsequent change (both under consideration by the translator component) negates it. For example, if it is shown in the relational database 112 that a person has friended, and then unfriended, another person, it would serve no purpose to note the friendship status only to immediately remove/overwrite it When not unwarranted (i.e., warranted), the translator 304 translates the detected changes 302 into graph update specifications and/or modification instructions 314. The ingest processor 312 receives and applies the modification instructions 314 to the knowledge graphs 120. The graph manager 310 and its subcomponents are hosted by the analyzer (daemon) 316 within an electronic device (see e.g., the end-user device 100 of FIG. 1).

In one example embodiment, the nodes and edges of the knowledge graphs 120 are considered in two main levels: there are the node primitives: moment, person, date and location; and there are more abstract higher-level nodes which are derived from the primitives. The moment, person, date and location can be driven, updated and managed directly based on changes coming directly from the relational database objects. Social groups are collections of person nodes within the knowledge graph 120. The knowledge graphs 120 infer the existence of the social group, though the social group has no counterpart in the relational database 112. The social group can be very large and have many person nodes, each of which may have multiple relationships (edges) with other nodes. Thus, changing a single property of a node (based on a change in a property of an object) in the relational database 112 can necessitate a large number of modifications to the knowledge graphs 120. In an embodiment, the translator 304 can determine, based on computational expense, which changes to translate more immediately and which changes to delay. In another embodiment, the translator 304 provides input to a set of post processing steps (not shown) that are responsible for taking the graph update specification(s) 314 generated by the translator 304 and using the specification(s) 314 along with updated knowledge graphs 120 (i.e., the knowledge graphs 120 after updates by the translator 304 are applied) to produce additional updates to the high-level nodes in the knowledge graphs 120.

In one example, the translator 304 may receive a notice indicating that a new object, such as a moment object, has been created. The translator 304 might then receive notice that a location property of the moment object has changed, and thereafter that the time property of the moment object. In order to save time and computational expense, the new moment object can be added to the knowledge graphs 120 with all three properties at once. In some cases, even with such consolidation, some updates to the knowledge graphs 120 can be computationally expensive. It can take time to evaluate what aspects of the nodes need to be updated, especially in terms of relationships. A person object could have its name property changed, (perhaps a user of the electronic device that includes a DA management system might realize he had misspelled his wife's name and decide to correct it). A person node corresponding to that object may have faces distributed across multiple moment nodes. It can be expensive to all of such moment nodes. In that case, a DA management system can do a fast update to record the fact in a person node that the name has been changed, but without immediately working out all of the details of relationships in the knowledge graphs 120 that might be affected.

In some example embodiments, the knowledge graphs 120 maintained and updated using the architecture 300 may include a personal DA knowledge graph 122 and a shared DA knowledge graph 124. Initially, many DAs will not be linked to the shared DA library. Through the smart sharing options described herein, DAs related to the personal DA library or a syndication library become linked to the shared DA library. As needed, the architecture 300 updates the personal DA knowledge graph 122 and the shared DA knowledge graph 124 to track new DAs and new sharing of DAs.

Figure 4:
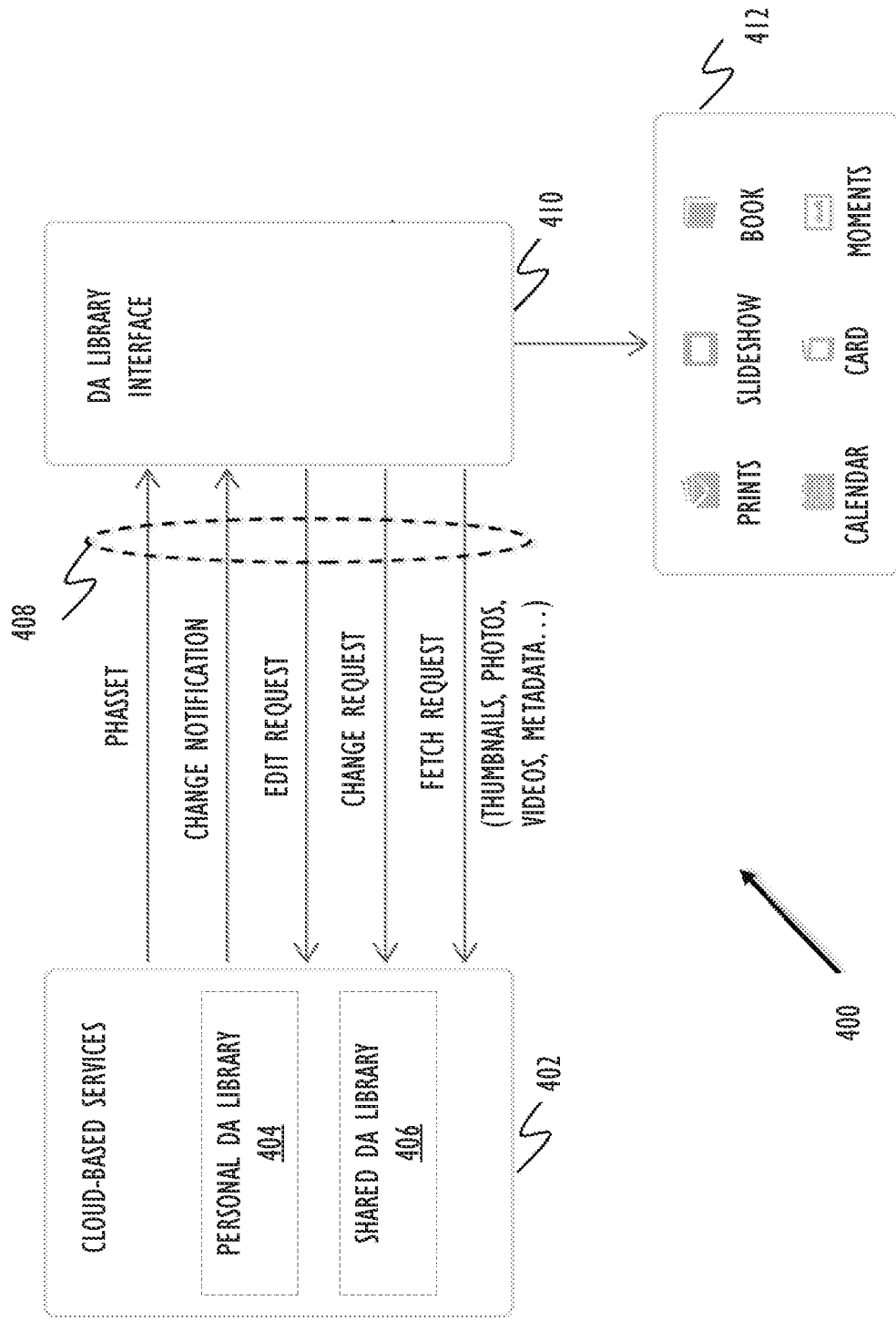
FIG. 4 illustrates, in block diagram form, DA library operations, in accordance with an embodiment.

FIG. 4 illustrates, in block diagram form, a DA library scenario 400, in accordance with an embodiment. In the example of FIG. 4, the DA library scenario 400 includes cloud-based services 402 and related devices configured to maintain a personal DA library 404 and a shared DA library 406. The personal DA library 404 and a shared DA library 406 maintained by the cloud-based services and/or DAs in a local DA library are accessible via a DA library interface 410. In some example embodiments, the DA library interface 410 (e.g., the PhotoKit interface from Apple Inc.) provides classes that support building photo-editing extensions for the personal DA library 404 and/or shared DA library 406. For different operating systems (e.g., iOS®, macOS®, and tvOS® operating systems, of which iOS is a registered trademark of Cisco Technology Inc., and macOS and tvOS are registered trademarks of Apple Inc.), the DA library interface 410 also provides direct access to DAs managed by a Photos application. Example operations 408 that are handled by the DA library interface 410 include fetching and caching assets of the personal DA library 404 and/or shared DA library 406 for display and playback, editing image and video content, or managing collections of assets such as albums or shared albums. Example projects 412 supported by the DA library interface 410 include prints, slideshows, books, calendars, moments, and wall décor. In some example embodiments, the DA library interface 410 includes or is in communication with a DA manager (e.g., a move DA interface 150 or related processor(s)) configured to perform DA move options as described herein. Based the DA move options and related share operations, the shared DA library 406 may become populated with additional DAs over time. Alternatively, with the unshare option, a shared DA library may become less populated with DAs as participants move shared DAs into their respective personal DA library. When the shared DA library 406 is populated, the DAs of the shared DA library 406 are available to all participants. As an example, each participant of the shared DA library 406 may utilize query, organization, and featured DA options related to operations 408, projects 412 and/or other access options. In some example embodiments, the DA library interface 410 may include a "Move Request" from Library to Cloud services.

Figure 5:
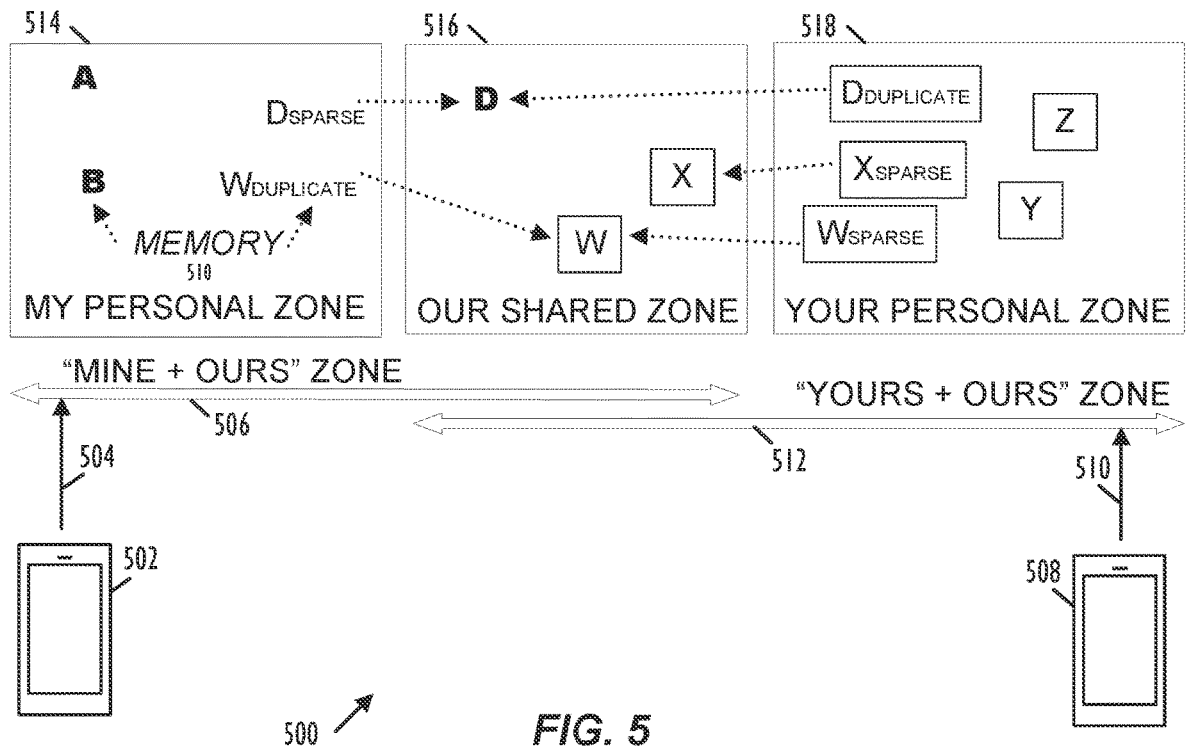
FIG. 5 illustrates, in block diagram form, a federated DA management system and related DA relationships in accordance with an embodiment.

FIG. 5 illustrates, in block diagram form, a federated DA management system 500 and related DA relationships in accordance with an embodiment. As shown, the federated DA management system 500 includes: a first personal DA library 514 (labeled "my personal zone"); a shared DA library 516 (labeled "our shared zone"); and a second personal DA library 518 (labeled "your personal zone"). In the example of FIG. 5, the first personal DA library 514 stores a set of DAs including: A; B; D$_{PRIVATE}$; and W$_{DUPLICATE}$. The shared DA library 516 stores another set of DAs including: D; W; and X. The second personal DA library 518 stores yet another set of DAs including: D$_{DUPLICATE}$; W$_{PRIVATE}$; X$_{PRIVATE}$; Y; and Z. Without limitation, certain DAs in the first personal DA library 514 may be related (e.g., B and W$_{DUPLICATE}$ are linked as a Memory 510). In other scenarios embodiments, different DAs of the first personal DA library 514, the shared DA library 516, or the second personal DA library 518 may be linked as a moment, a Memory, and/or another linkage feature. As used herein, a "Memory" refers to a multimedia presentation constructed from various DAs accessible in an end-user's DA library, and which may include accompanying music, transitions between DAs, animations, text, captions, or other graphical elements, etc. Memories may be related to particular events, places, persons, holidays, seasons, etc., reflected in an end-user's DA library." In some example embodiments, the DA move options described herein provide the ability to create Memories from both personal and shared DAs. For example, a first end-user may see a different Memory related to a particular moment or Event than a second end-user (e.g., because the first end-user has some different personal DAs related to the Memory that the second end-user doesn't have access to.

As shown in FIG. 5, the first personal DA library 514 and the shared DA library 516 may be labeled a "mine+ours" zone 506, which is accessible to a first end-user device 502. Also, the second personal DA library 518 and the shared DA library 516 may be labeled a "your+ours" zone 512, which is accessible to a second end-user device 508. With access to the first personal DA library 514 and/or the shared DA library 516, a first participant in the shared DA library 510 and owner of the first end-user device 502 may perform operations such as viewing DAs or editing DAs in the first personal DA library 514 and/or the shared DA library 516. Similarly, with access to the second personal DA library 518 and/or the shared DA library 516, a participant in the shared DA library 516 and owner of the second end-user device 508 may perform operations such as viewing DAs or editing DAs in the second personal DA library 518 and/or the shared DA library 516.

In some example embodiments, the original contributor of shared DAs may be recorded. Also, there are some scenarios where the original contributor of a shared DAs may not be clear (e.g., if participants of the shared DA library 516 previously transferred a DA to each other prior to the shared DA library 516 being established). This lack of clarity may be recorded as well. In the example of FIG. 5, the DAs A, B, and D are bolded to indicate these DAs originated with (e.g., were captured by a camera of) the first end-user device 502. Also, D has been moved from the first personal DA library 514 to the shared DA library 516, resulting in a new DA record for D in the shared DA library 516 and a sparse record D$_{SPARSE}$ being maintained in the first personal DA library 514. Also in FIG. 5, D$_{DUPLICATE}$, W$_{PRIVATE}$, X$_{PRIVATE}$, Y, and Z are boxed to indicate these DAs originated with (e.g., were captured by a camera of) the second end-user device 508. Also, W and X have been moved from the second personal DA library 518 to the shared DA library 516, resulting in new DA records for W and X in the shared DA library 516 and sparse records W$_{SPARSE}$ and X$_{SPARSE}$ being maintained in the second personal DA library 518.

In the example of FIG. 5, the first personal DA library 514 includes a duplicate DA (W$_{DUPLICATE}$), which was not obtained from the shared DA library 516 (e.g., W$_{DUPLICATE}$ may have been obtained from the second end-user device 508 prior to the shared DA library 516 being established). The second personal DA library 518 also includes a duplicate DA (D$_{DUPLICATE}$), which was not obtained from the shared DA library 516 (e.g., D$_{DUPLICATE}$ may have been obtained from the first end-user device 502 prior to the shared DA library 516 being established).

In some example embodiments, the asynchronous DA move model 152 supports the different possibilities represented in FIG. 5. Without limitation, DA records may be designated as either private or shared depending on their location in a personal zone (primary sync) or a shared zone respectively. To make a DA record shared, the DA record is moved out of the personal zone and into the shared zone. In some example embodiments, there may only be a single copy of each DA, where each DA lives in one location.

In some example embodiments, a DA viewer application (e.g., DA viewer application 149 in FIG. 1, or "my photo library") spans across the personal and shared DA libraries in the "mine+ours" zone 506. In such embodiments, an end-user's library scope may include personal photos, photos shared by the end-user, and photos shared to the end-user. Also, clients may sync from both the personal zone and the shared zone to view the entire library. In some example embodiments, a sparse DA record includes a private representation of a shared DA, where the sparse DA record is designed to hold private data about the shared DA. In some example embodiments, the sparse DA record is left before once a given DA record is moved from a personal zone to the shared zone. Any record in the full library scope (e.g., a personal DA library and a shared DA library) can participate in cloud-based library features and relational entities like albums, suggestions, peoples, etc. In some example embodiments, relationships (e.g., private field values, deduplications, entity relations) are maintained in the shared DA library 516 via a reference to the private sparse record which in turn has a weak reference to the shared record.

Figure 6:
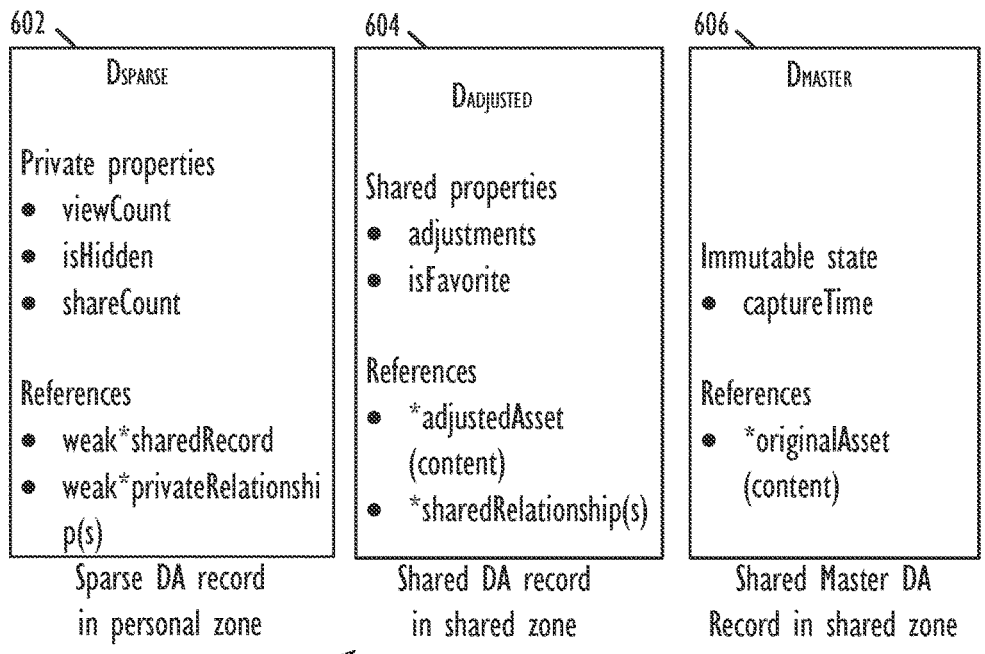
FIG. 6 illustrates, in block diagram form, DA records related to DA move options between a personal DA library and a shared DA library in accordance with an embodiment.

FIG. 6 illustrates, in block diagram form, DA records 600 related to DA moves between a personal DA library (e.g., the personal DA library 404 in FIG. 4) and a shared DA library (e.g., the shared DA library 406 in FIG. 4) in accordance with an embodiment. The DA records 600 include a sparse DA record 602 (labeled D$_{SPARSE}$), an adjusted DA record 604 (labeled D$_{ADJUSTED}$), and a master DA record 606 (labeled D$_{MASTER}$). In the example of FIG. 6, the sparse DA record 602 includes private properties such as viewcount, a hidden status (labeled isHidden), and a sharecount. In response to a DA share, the sparse DA record 602 is maintained in the personal zone from which the DA is shared. In some example embodiments, the sparse DA record 602 weakly references the shared DA record and private relationships. A DA share also results in a new DA record (the adjusted DA record 604) being created in the shared zone. The adjusted DA record includes shared properties such as adjustments and a favorite status (labeled isFavorite). In some example embodiments, the adjusted DA record 604 may reference an adjusted asset (e.g., DA content) and shared relationship information. The DA share also results in a shared master DA record 606 being added to the shared zone. The shared master DA record 606 includes an immutable state (labeled captureTime) and references original DA content (labeled originalAsset)

In some example embodiments, DA move operations include performing two requests to separate databases. Upon sharing a DA, a sparse DA record (e.g., the sparse DA record 602) is inserted in a personal DA library or zone. Also, a new DA record (e.g., the adjusted DA record 604 and the shared master DA record 606) is inserted into the shared DA library or zone. Upon unsharing a DA, the DA record in the shared DA library is marked as expunged and a full DA record (including the shared master DA record 606) replaces the sparse record in the personal DA library or zone. If either request succeeds and the other fails, recovery operations are performed.

Figure 7:
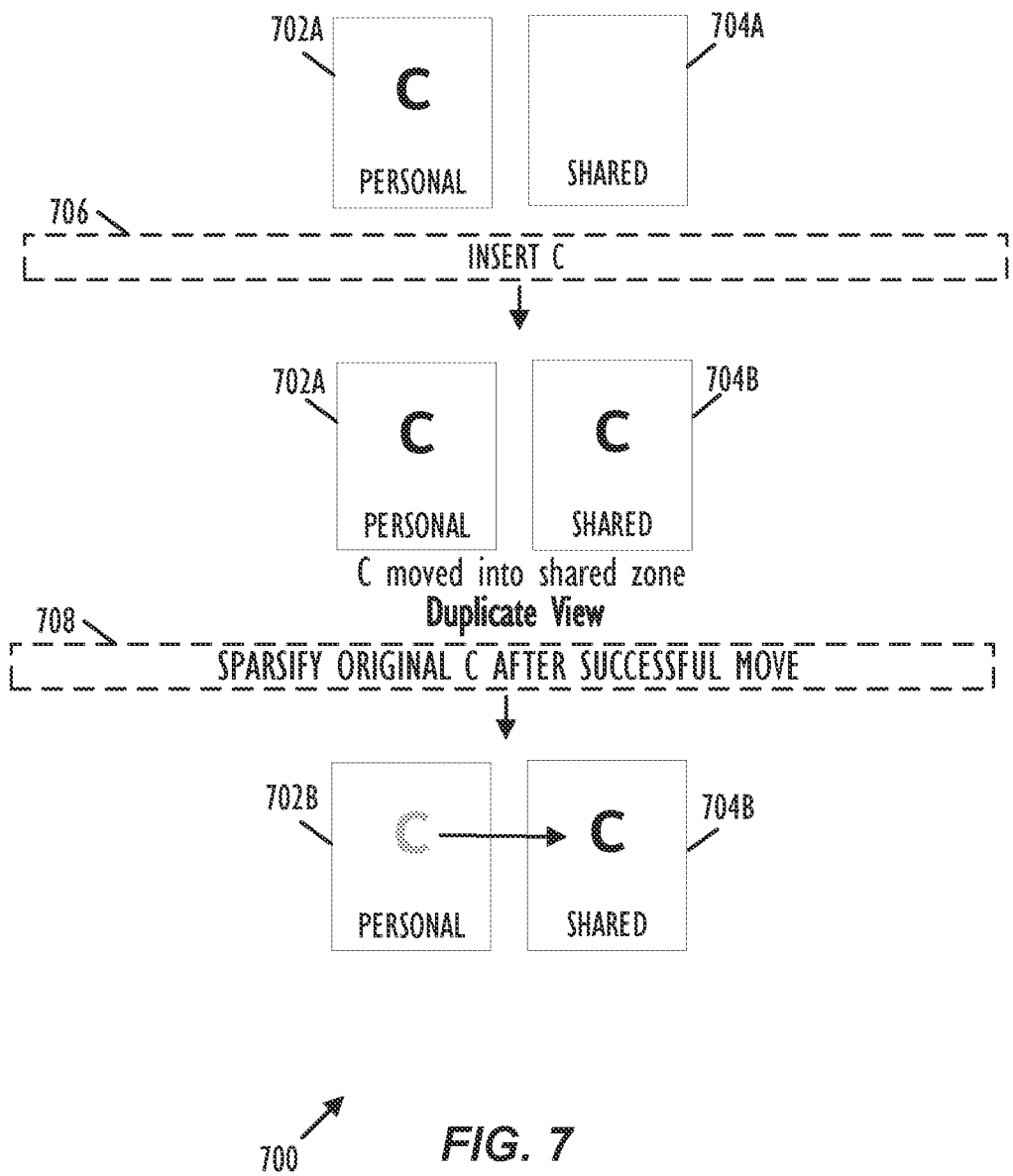
FIG. 7 illustrates, in block diagram form, DA move options in accordance with an embodiment.

FIG. 7 illustrates, in block diagram form, DA move options 700 in accordance with an embodiment. Initially, a personal DA library or zone 702A includes a DA record (labeled "C") and the shared DA library or zone 704A does not include C. A first set of operations 706 are then performed, in which a duplicate view of C is added to the shared DA library or zone 704A, resulting in an updated shared DA library or zone 704B that includes C. After C is successfully duplicated and moved, a second set of operations 708 are performed to sparsify C in the personal DA library or zone 702A, resulting in an updated personal DA library or zone 702B that includes a sparsified C. In some example embodiments, C includes different parts such as: a master record; shared fields; and private fields. In such embodiments, only the master record and shared fields portions of C may be duplicated and moved to the shared DA library or zone 704A (the private fields are not duplicated or moved to the shared DA library or zone 704A).

With DA move options 700, a multi-step request process is represented. In some example embodiments, the destination insert is always written before cleaning up the origin record. Effectively, a copy of the data is made and then the copy is moved via cleanup of the origin record. If this last step fails recovery is facilitated through a repair work item to re-attempt cleanup of the origin record. During the move, the server side uses internal signposts on the record to track moves in progress. Logic is introduced on the client side (by the end-user devices) to understand potential mid-move states and to avoid showing users a duplicate view.

In some example embodiments, a signpost is a list field of the DA record. Without limitation, a signpost may include a signpost identifier (ID), an origin record locator, and a destination record locator. Different signposts are possible. The signpost ID is generated at the start of the inline move, and is included in the source cleanup work item model. As an example, a signpost may be given as: signpost= [source_signpost_1, destination_2. For cleanup/sparsification, a work item is enqueued for a specific signpost. If the destination doesn't have that signpost in its list, nothing is done (i.e., the move didn't succeed). For a remove/cleanup origin signpost, if the destination has that signpost in its list, the move was success. For a check origin signpost, if the origin has any complete signpost on it which is newer than our expected source signpost, the origin record is not sparsified (e.g., some unshare happened). A completed signpost could be a destination signpost in some share/unshare scenarios. As another option, the completed signpost could be some other origin signpost. This just means that a later move retry succeeded in completing the sparsification.

In some example embodiments, a list field is used for the signpost to enable the original record to know whether it should perform the sparsify or not. For a destination record, there may be multiple origin records that need to be sparsified. Multiple users could share the same DA and need work items to complete sparsification. Origin sparsify should not be performed if the source signpost is older than some destination signpost on the source record.

Figure 8:
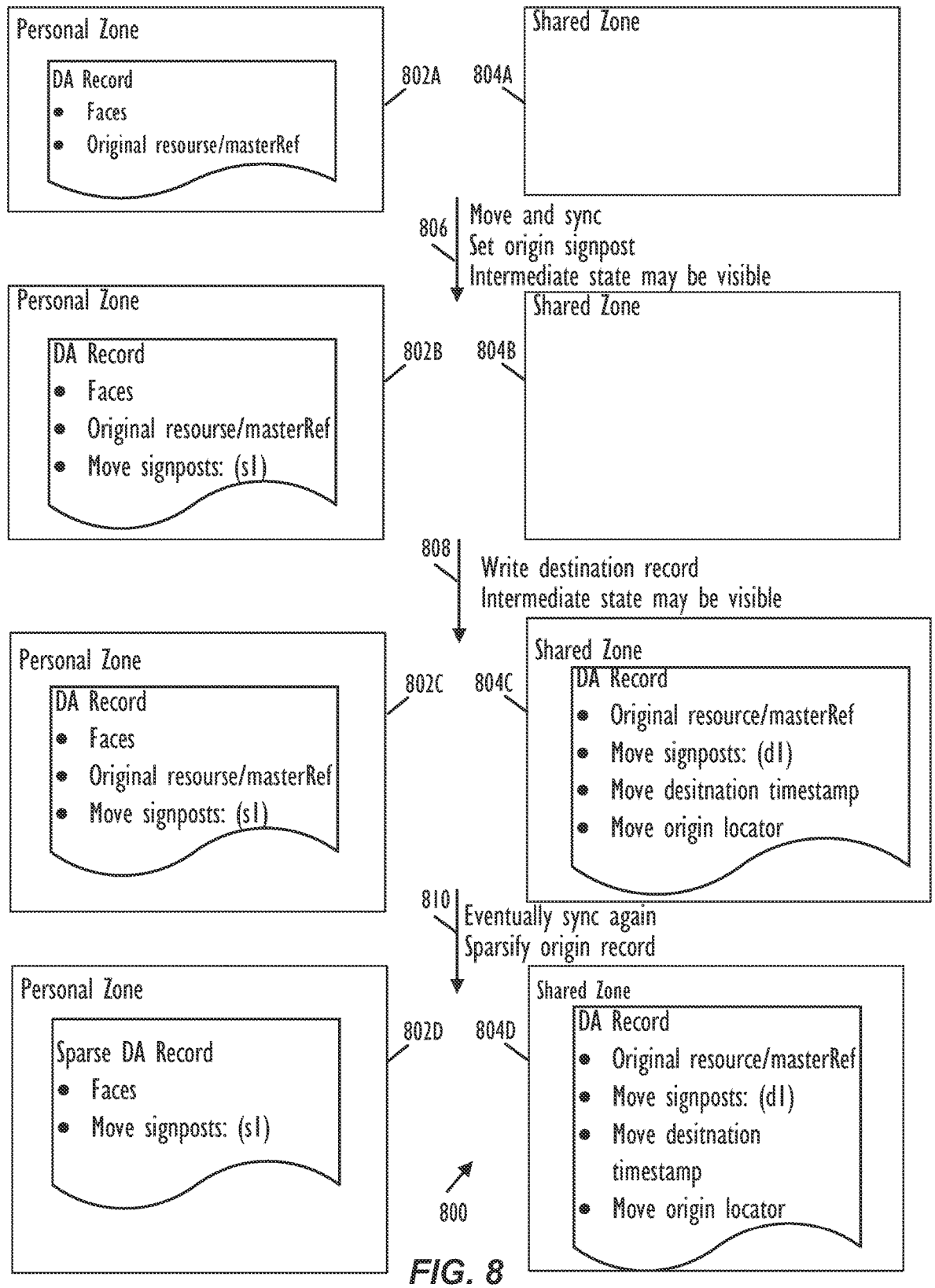
FIG. 8 illustrates, in block diagram form, an asynchronous DA move method in accordance with an embodiment.

FIG. 8, in block diagram form, an asynchronous DA move method 800 in accordance with an embodiment. In the example of FIG. 8, an initial personal DA library or zone 802A includes a DA record with faces and an original resource or master record (masterRef). Meanwhile, the initial shared DA library or zone 804A includes no DA record. The method 800 performs a first set of operations 806. In some example embodiments, the first set of operations 806 include a move and sync operation as well as a set origin signpost operation. Once the first set of operations 806 are performed, an updated personal DA library or zone 802B includes a DA record that includes a move signpost (s1). After the first set of operations 806, an updated shared DA library or zone 804B may include an intermediate state (to show a move is in process). A second set of operations 808 are performed after the first set of operations 806. The second set of operations 808 include writing a destination record, resulting in an updated shared DA library or zone 804C. In some example embodiments, the updated shared DA library or zone 804C includes a DA record having the original resource/master record, a move signpost (D1), a move destination timestamp, and a move origin locator. An intermediate state may still be visible for the updated shared DA library or zone 804C at this point of the method 800. Meanwhile, the updated personal DA library or zone 802C after the second set of operations 808 may be the same as the updated personal DA library or zone 802B after the first set of operations 806.

As shown, the method 800 includes a third set of operations 810. In some example embodiments, the third set of operations 810 include an eventual sync (indicating the DA move was successful and the updated shared DA library or zone 804D include the new DA record). The third set of operations 810 also includes sparsifying the origin record in the personal DA library or zone 802D, resulting in a sparse DA record that omits the original response/master record. In some example embodiments, the sparse DA record in the updated personal DA library or zone 802D maintains faces and an updated signpost.

The method 800 is sometimes referred to herein as an eventually consistent move model. In some example, the eventually consistent move model includes the follow steps:
1. Enqueue work item to check and clean up mid-move states
   a. Note: Should have obtained destination change token before enqueuing work item so that work item conflicts with inline orphaned work items
2. Set signpost on origin record
   a. signpost means "maybe moved to {destinationId}"
   b. origin signpost is important to prevent orphaned work items (e.g., caused by a share followed by an unshare)
   c. could be used to block record saves from non-mover clients to avoid adjustment clobbering (a state where a change or adjustment was made to the origin record which is being moved)—if the adjustment is applied after the copy phase of the move, the adjustment would be lost when the origin record is sparsified.
3. Save destination record
   a. this has a signpost saying "definitely moved from {originID}"
      i. no sync obligation
   b. if the destination record save completes, the whole move should be considered complete
      i. there's no rollback, so we have no other options after this step
4. Update origin record
   a. If share, make it sparse. If unshare, expunge the record.
5. Optional: Remove work item
   a. If inline move ran to completion, work item is not needed In the described DA move operations, a sparse DA record refers to personal DA library representation of shared records designed to hold private data about the shared DA that live in an end-user's personal DA library or zone. Each personal DA library or zone is cryptographically private from other shared library participants. During a share, the DA record is actually divided between a sparse DA record and a shared DA record. The sparse DA record is retained in the personal DA library or zone as a shell DA record that only holds a subset of the record fields, which are designated as private fields only. The private fields cannot be written to a shared DA record. Examples of private fields include a viewCount and a playCount. The shared DA record refers to a moved DA record in shared DA library zone that holds all fields except the private fields. In some example embodiments, the shared DA record includes mutual and shared fields. Shared fields are all resources and the master record (masterRef or remappedRef). The shared DA record is considered a "complete" record even without a private component but a sparse DA record has no significance if the shared DA record does not exist. The private/shared/mutual fields are distinguished and enforced by the servers.

In some example embodiments, the asynchronous DA move model 152 and related instructions enable share and unshare move options. Without limitation, the share and unshare moves involve the following:

Share→
  Personal DA library CPLAsset becomes sparse shared only fields are stripped, isSparsePrivateRecord set to true, share linking fields added
  Personal DA library CPLMaster→
    If master still needed in zone (i.e., if any private CPLAssets will still point to CPLMaster)→unchanged
    If all CPLAssets pointing the CPLMaster are moved →expunged (isDeleted=1, isExpunged=1)
  CPLAsset and CPLMaster get added to the shared zone and follow deduplication logic
  User gets added to contributor list
Unshare→
  Shared CPLAsset becomes expunged (isDeleted=1, IsExpunged=1)
  Shared CPLMaster
    If master still needed in zone (i.e., if any shared CPLAssets will still point to CPLMaster)→unchanged
    If all CPLAssets pointing the shared CPLMaster are moved→becomes expunged
  Private sparse CPLAsset becomes a full asset→persisted private only and mutual fields kept, shared only fields copied over from shared record
  If private CPLMaster was expunged→becomes a live record again in schema In some example embodiments, the asynchronous DA move model 152 and related instructions enable exit move options related to one or more participants exiting a shared DA library or zone and/or related to a shared DA library being suspended or dismantled. Without limitation, the exit move options are initiated by participant self exit, participant removal by owner, and/or owner dismantle. Exit retention option include: do not retain any photos; retain all photos; and retain only contributed photos. In some example embodiments, a server may copy the shared DA library or zone into a temporary staging zone that only the exiting user syncs with. The staging zone may be consistent with shared zone at time of completion. The shared DA library or zone will be put into recoverable destructive changes mode during copy, where purges will be blocked and all unshares will leave a copy. Once the staging zone is complete, the client will switch to syncing to the staging zone instead of the shared DA library or zone and the exiting participant can be removed as a participant in the shared DA library or zone. At this point, the client may start moving desired photos back into shared zone. While DA moves are in progress, the client may sync the join of the staging+personal DA library zone as a single private zone to the user.

In some example embodiments, the move options related to an exit from or dismantling of a shared DA library are based on an exit library or zone. In such embodiments, DAs are copied from shared DA library or zone to the exit library or zone. Thereafter, DAs are moved from the exit library or zone to a given personal DA library or zone. In some example embodiments, an exit library or zone for the exiting participant is created in the shared DA library owner's personal DA library. The exit library zone is not synced and is not visible to the owner of the original shared DA library or zone. In some example embodiments, all the shared DA library or zone records are copied into the exit library or zone. The exiting participant is accepted into the exit library or zone as needed, and may be removed from the shared DA library or zone.

Figure 9A:
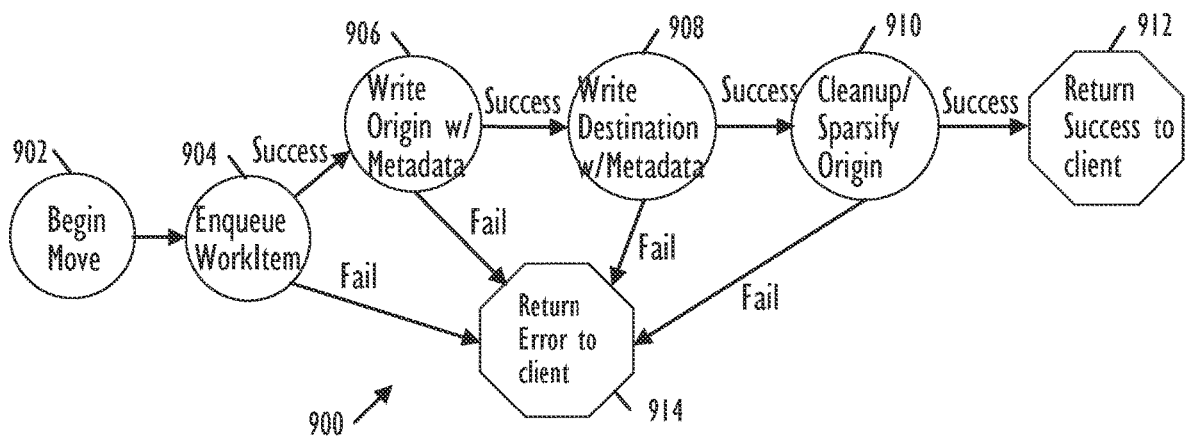
FIGS. 9A and 9B illustrates, in flowchart form, DA move methods in accordance with different embodiments.
Figure 9B:
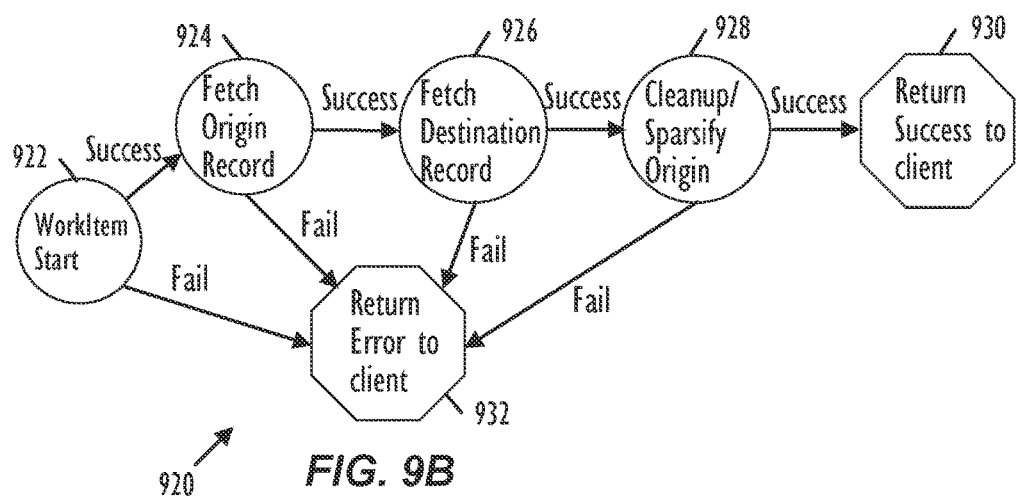

FIGS. 9A and 9B illustrates, in flowchart form, DA move methods 900 and 920 in accordance with another embodiment. In the DA move method 900 of FIG. 9A, DA move state machine related to serverside operations is represented. As shown, a DA move begins at operation 902. At operation 904, a work item is enqueued. If enqueueing the work item is successful, the method 900 proceeds to write to the origin DA record with metadata at operation 906. If successful, the method 900 proceeds to write to the destination DA record with metadata at operation 908. If successful, the method 900 proceed with cleanup and origin DA record sparsification at operation 910. If successful, the method 900 returns a success indication to the client (end-user device) at operation 912. If any of the operations 904, 906, 908, or 910 are not successful (e.g., due to time-out or other failure), the method 900 returns an error to the client at operation 914. If the event of an error, recovery operations are performed to try the DA move again at a later time.

In the DA move method 920 of FIG. 9B, a work item is started at operation 922. If the work item start is successful, the method 920 proceeds to fetch the origin DA record at operation 924. If successful, the method 920 proceeds to fetch the destination DA record at operation 926. If successful, the method 920 proceeds with cleanup and origin DA record sparsification at operation 928. If successful, the method 920 returns a success indication to the client (end-user device) at operation 930. If any of the operations 922, 924, 926, or 928 are not successful, the method 920 returns an error to the client at operation 932. If the event of an error, recovery operations are performed to try the DA move again at a later time.

Figure 10:
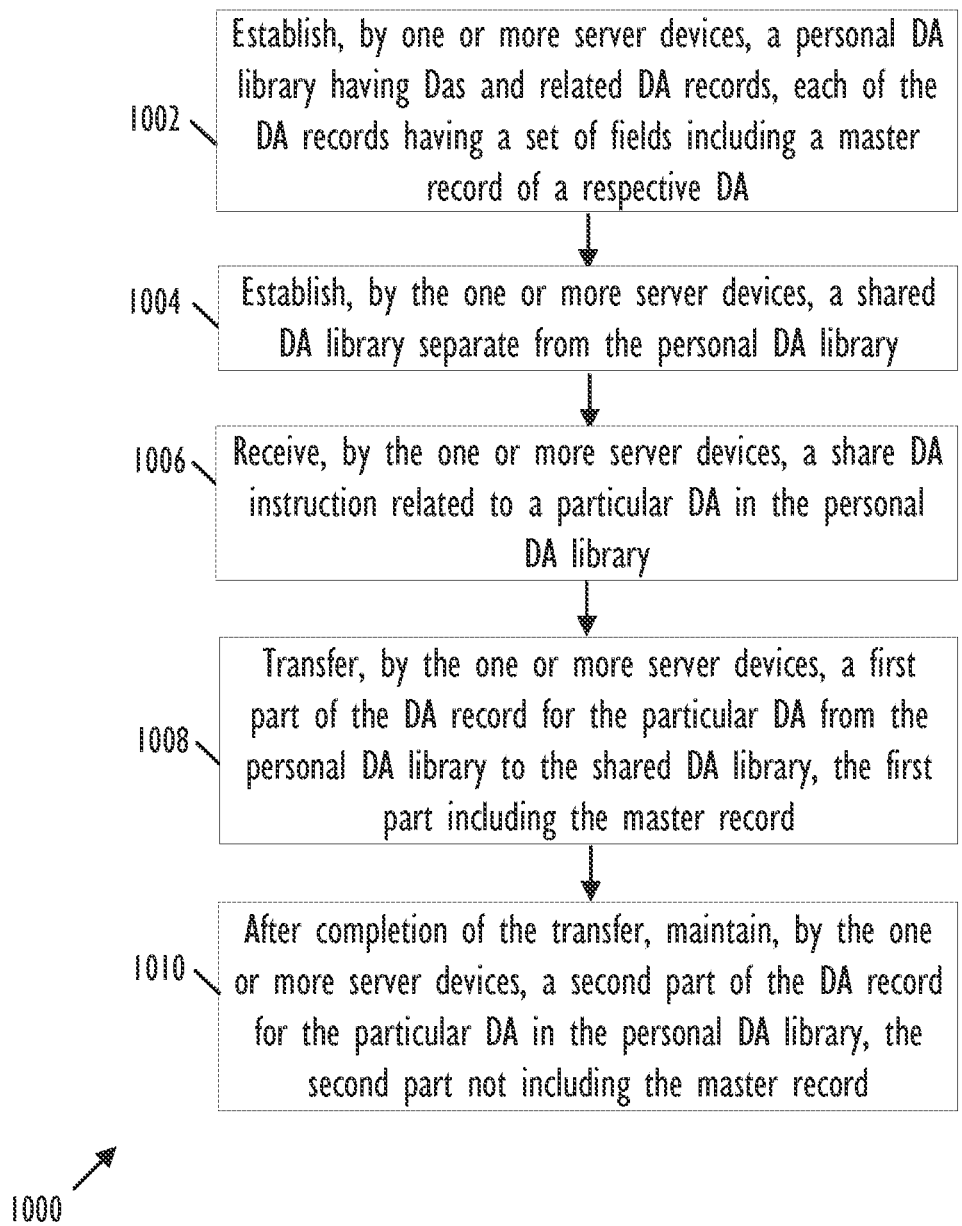
FIG. 10 illustrates, in flowchart form, another DA move method in accordance with an embodiment.

FIG. 10 illustrates, in flowchart form, another DA move method 1000 in accordance with an embodiment. As shown, the method 1000 includes establishing, by one or more server devices, a personal DA library having DAs and related DA records at block 1002, where each of the DA records has a set of fields including a master record of a respective DA. At block 1004, a shared DA library separate from the personal DA library is established by the one or more server devices. At block 1006, a share DA instruction related to a particular DA in the personal DA library is received by the one or more server devices. At block 1008, a first part of the DA record for the particular DA from the personal DA library is transferred, by the one or more server devices, to the shared DA library, where the first part includes the master record. Block 1008 is performed, for example, in response to the share DA instruction received at block 1006. In some example embodiments, transferring the first part of the DA record for the particular DA from the personal DA library to shared DA library at block 1008 includes queueing the related transfer until a later time. At block 1010, after completion of the transfer, a second part of the DA record is maintained, by the one or more server devices, for the particular DA in the personal DA library. The second part of the DA record corresponds to the sparse DA record described herein and does not include the master record.

In some example embodiments, the second part of the DA record includes a set of private properties for the particular DA, where the set of private properties are not included with first part of the DA record transferred to the shared DA library. In some example embodiments, the private properties include a viewcount or a face identification. In some example embodiment, the method 1000 includes updating the second part of the DA record to include move status information related to transferring the first part of the DA record to the shared DA library. In some example embodiments, the method 1000 includes maintaining the master record of the particular DA in the second part of the DA record until the transfer is completed. In some example embodiments, the method 1000 includes displaying an intermediate state in the shared DA library before transfer of the first part of the DA record to the shared DA library is complete. In some example embodiments, the method includes displaying DAs in the personal DA library and DAs in the shared DA library together in a DA viewer application of the first participant.

In some example embodiments, the method 1000 includes: receiving an unshare request, by the one or more server devices, for the particular DA by a participant of the shared DA library; and in response to the unshare request, initiating transfer of the particular DA from the shared DA library to the requester's personal DA library. In some example embodiments, the method 1000 includes: receiving an exit request, by the one or more server devices, to exit the shared DA library by an exiting participant of the shared DA library; in response to the exit request, establishing an exit DA library with copies of DAs in the shared DA library; and maintaining the exit DA library until the existing participant completes an exit process. In some example embodiments, the method 1000 includes: receiving a participant exit or removal request, by the one or more server devices, related to the shared DA library by a requesting participant of the shared DA library; in response to the participant exit or removal request, obtaining contribution information for DAs in the shared DA library; and performing participant exit or removal operations based on the contribution information related to the requesting participant.

Relative to a conventional strict move model, the asynchronous DA move model (also referred to as the eventually consistent move model) offers some improvements. In the convention strict move model changes to the moving records are "staged" and not actually committed until the transaction succeeds (i.e., when A1_sparse is staged, it is not "live" until the transaction coordinator decides that the transaction is committed). So any read for A1/A1_sparse in PrimarySync would make a request to the transaction coordinator to decide if the pre-move version or post-move version should be returned. If either request fails for some reason, the "staged" changes will not actually land (i.e., inherently reverting the change). Also, updates to indexes and auxiliary records or index records (additional records that end up being modified as a result of the move) go live immediately. This issue raises concerns about staging and revert stages. For example, for index scans, and index query returns all record fields. If the case record is in a "move-in-progress" state, the server extension may return a special field which indicates move in progress. When rollback happens, reindexing and recounting is retriggered with the conventional strict move model.

In contrast to the conventional strict move model, the asynchronous DA move model does not guarantee that origin and destination zones will update at the same time. Instead, the destination is updated first, and the origin is updated second and may need a work item to eventually push it to completion. In more rare cases, a groomer job may push it to completion. Also, the asynchronous DA move model relies on the client to interpret mid-move states with duplicate records. In some example embodiments, a non-transaction client state machine does not have a sync obligation and may see duplicates in the shared and private DA libraries or zones until source cleanup executes. Most of the time (e.g., 99.x % of the time), origin should become sparse in the inline flow before returning to client. 0.x % of the time, the work item will perform the sparsification after N minutes. Also, the inline client retry also completes the sparsification, so work item should be rarely needed.

If the destination record was written, the move should be interpreted as a success (although the sparse origin update may still be pending if the inline request didn't complete due to server error or other error. Origin sparsification will not fail through server rejection. If origin sparsification were to fail (e.g., due to some retriable reason), the work item will keep retrying. The work item may decide not to sparsify in case of the share/unshare scenario. In some example embodiments, origin related errors may be returned to the client inline. As needed, a client retry will eventually push the move to completion.

With asynchronous DA move model, there is no rollback. Cleanup of origin signposts for failed moves does not touch any client visible fields (cleanup is not optional if we use the origin signpost to block writes from non-mover devices). With asynchronous DA move model, there is no locking. Both the origin and destination record are allowed to be modified mid-move. Also, origin writes may be blocked for non-mover devices. In such embodiments, there is reliance on server conflict resolution. As needed, client retries can proceed and push moves to completion. In some example embodiments, origin writes may be blocked mid-move to avoid adjustment clobbering. During some move stages, writes to the origin record could be blocked. Also, inline client retries are supported by blocking conflicting writes only from non-initiating devices.

Figure 11:
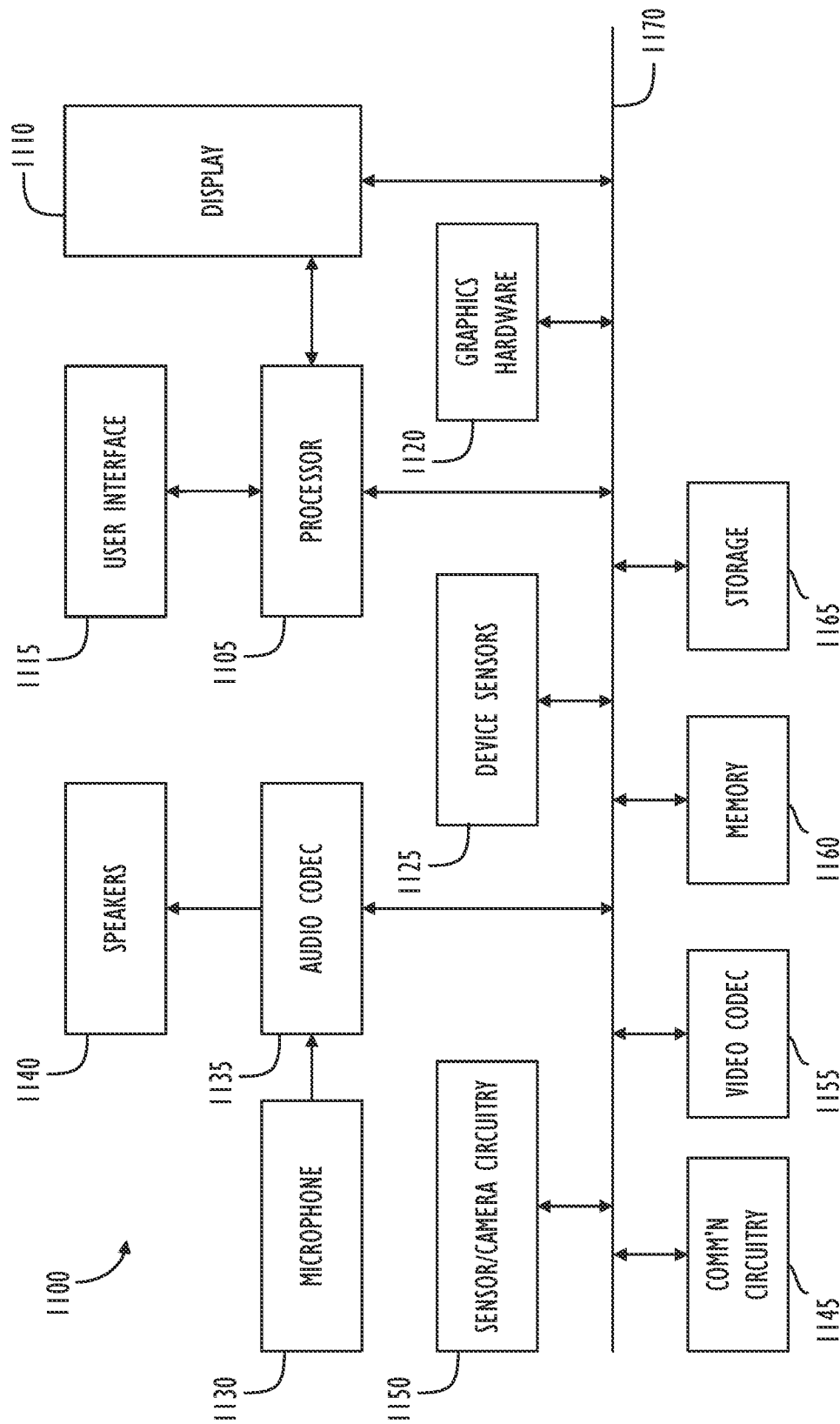
FIG. 11 illustrates a simplified functional block diagram of illustrative programmable electronic device for DA management in accordance with an embodiment.

FIG. 11 illustrates a simplified functional block diagram of illustrative programmable electronic device 1100 (an example of the DA management system 100 in FIG. 1, or one of the end-user devices 202A-202N in FIG. 2) for DA management in accordance with an embodiment. The electronic device 1100 could be, for example, a mobile telephone, personal media device, portable camera, or a tablet, notebook or desktop computer system, as well as a wearable computing device such as a smart watch. As shown, electronic device 1100 may include a processor 1105, a display 1110, a user interface 1115, a graphics hardware 1120, device sensors 1125 (e.g., proximity sensor/ambient light sensor, accelerometer and/or gyroscope), a microphone 1130, audio codec(s) 1135, speaker(s) 1140, communications circuitry 1145, image capture circuit or unit 1150, which may, e.g., comprise multiple camera units/optical sensors having different characteristics (as well as camera units that are housed outside of, but in communication with the electronic device 1100), video codec(s) 1155, computer-readable memory 1160, storage 1165, and communications bus 1170.

The processor 1105 may execute instructions necessary to carry out or control the operation of many functions performed by the electronic device 1100 (e.g., such as the generation and/or processing of DAs in accordance with the various embodiments described herein). The processor 1105 may, for instance, drive the display 1110 and receive user input from the user interface 1115. The user interface 1115 can take a variety of forms, such as a button, keypad, dial, a click wheel, keyboard, display screen and/or a touch screen. The user interface 1115 could, for example, be the conduit through which a user may view a captured video stream and/or indicate particular images(s) that the user would like to capture or share (e.g., by clicking on a physical or virtual button at the time that the desired image is being displayed on the device's display screen).

In one embodiment, the display 1110 may display a video stream as it is captured while the processor 1105 and/or the graphics hardware 1120 and/or image capture circuitry contemporaneously store the video stream (or individual image frames from the video stream) in the computer-readable memory 1160 and/or the storage 1165. The processor 1105 may be a system-on-chip such as those found in mobile devices and include one or more dedicated graphics processing units (GPUs). The processor 1105 may be based on reduced instruction-set computer (RISC) or complex instruction-set computer (CISC) architectures or any other suitable architecture and may include one or more processing cores. The graphics hardware 1120 may be special purpose computational hardware for processing graphics and/or assisting processor 1105 perform computational tasks. In one embodiment, graphics hardware 1120 may include one or more programmable graphics processing units (GPUs).

The image capture circuitry 1150 may comprise one or more camera units configured to capture images, e.g., images which may be managed by a DA management system. Output from the image capture circuitry 1150 may be processed, at least in part, by the video codec(s) 1155 the processor 1105, the graphics hardware 1120, and/or a dedicated image processing unit incorporated within circuitry 1150. Images so captured may be stored in the computer-readable memory 1160 and/or the storage 1165. The computer-readable memory 1160 may include one or more different types of media used by the processor 1105, the graphics hardware 1120, and the image capture circuitry 1150 to perform device functions. For example, the computer-readable memory 1160 may include memory cache, read-only memory (ROM), and/or random-access memory (RAM). The storage 1165 may store media (e.g., audio, image and video files), computer program instructions or software, preference information, device profile information, and any other suitable data. The storage 1165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). The computer-readable memory 1160 and the storage 1165 may be used to retain computer program instructions or code organized into one or more modules and written in any desired computer programming language. When executed by, for example, the processor 1105, such computer program code may implement one or more of the methods described herein.

For clarity of explanation, the embodiment of FIG. 11 is presented as including individual functional blocks including functional blocks labeled as the processor 1105 or the graphics hardware 1120. The functions these blocks represent may be provided through the use of either shared or dedicated hardware, including, but not limited to, hardware capable of executing software and hardware, such as the processor 1105 or the graphics hardware 1120, that is purpose-built to operate as an equivalent to software executing on a general-purpose processor. For example, the functions of one or more processors presented in FIG. 11 may be provided by a single shared processor or multiple processors. (Use of the term "processor" should not be construed to refer exclusively to hardware capable of executing software.) Illustrative embodiments may include microprocessor and/or digital signal processor (DSP) hardware, ROM for storing software performing the operations discussed below, and RAM for storing results, both of which may be subsumed within the computer-readable memory 1160. Very large-scale integration (VLSI) hardware embodiments, as well as custom VLSI circuitry in combination with a general-purpose DSP circuit, may also be provided.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

In some example embodiments, a system (e.g., the DA management system 100 of FIG. 1, any of the end-user devices 202A-202N of FIG. 2, or the electronic device 1100 of FIG. 11) includes: one or more processors (e.g., the processing unit(s) 140 in FIG. 1, or the processor 1105 in FIG. 11); and a memory (e.g., the computer-readable memory 110 in FIG. 1, memory of the processing unit(s) 140 in FIG. 1, and/or memory 1160 and storage 1165 in FIG. 11) for storing program instructions (e.g., the DA manager 142 or move DA interface 150 in FIG. 1) for the one or more processors. The instructions, when executed, cause the one or more processors to: establish a personal DA library having DAs and related DA records, each of the DA records including a set of fields including a master record of a respective DA; establish a shared DA library separate from the personal DA library; receive a share DA instruction related to a particular DA in the personal DA library; transfer a first part of the DA record for the particular DA from the personal DA library to the shared DA library, the first part including the master record; and after completion of said transferring, maintain a second part of the DA record for the particular DA in the personal DA library, the second part not including the master record. In some example embodiments, the second part of the DA record includes a set of private properties for the particular DA, the set of private properties not included with first part of the DA record transferred to the shared DA library. In some example embodiments, the private properties include a viewcount or face identification.

In some example embodiments, the instructions, when executed, cause the one or more processors to update the second part of the DA record to include move status information related to transferring the first part of the DA record to the shared DA library. In some example embodiments, the instructions, when executed, cause the one or more processors to transfer the first part of the DA record for the particular DA from the personal DA library to shared DA library by queueing the related transfer until a later time. In some example embodiments the instructions, when executed, cause the one or more processors to maintain the master record of the particular DA in the second part of the DA record maintained by the personal DA library until the transfer is completed. In some example embodiments, the instructions, when executed, cause the one or more processors to display an intermediate state in the shared DA library before transfer of the first part of the DA record to the shared DA library is complete.

In some example embodiments, the system includes an end-user device having a DA viewer application, wherein DAs in the personal DA library and DAs in the shared DA library are displayed together in the DA viewer application. In some example embodiments, the instructions, when executed, cause the one or more processors to: receive an unshare request, by the one or more server devices, for the particular DA by a participant of the shared DA library; and, in response to the unshare request, initiate transfer of the particular DA from the shared DA library to the requester's personal DA library. In some example embodiments, the instructions, when executed, cause the one or more processors to: receive an exit request to exit the shared DA library by an exiting participant of the shared DA library; in response to the exit request, establish an exit DA library with copies of DAs in the shared DA library; and maintain the exit DA library until the existing participant completes an exit process. In some example embodiments, the instructions, when executed, cause the one or more processors to: receive a participant exit or removal request related to the shared DA library by a requesting participant of the shared DA library; in response to the participant exit or removal request, obtain contribution information for DAs in the shared DA library; and perform participant exit or removal operations based on the contribution information related to the requesting participant.

Although operations or methods have been described above in terms of some sequential operations, it should be appreciated that some of the operations described may be performed in a different order. Moreover, some operations may be performed in parallel, rather than sequentially. Embodiments described herein are not described with reference to any particular programming language. It will be appreciated that a variety of programming languages may be used to implement the various embodiments of the disclosed subject matter. In utilizing the various aspects of the embodiments described herein, it would become apparent to one skilled in the art that combinations, modifications, or variations of the above embodiments are possible for managing components of a processing system to increase the power and performance of at least one of those components.

As described above, one aspect of the present technology is the gathering and use of data available from various sources to improve the ability of users to manage and search for the information that is related to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to enable users to more quickly locate information for which they have an interest, and by extension the present disclosure enables users to have more streamlined and meaningful control of the content and information (personal and otherwise) that they share with others. Further, other uses for personal information data that benefit the user are also contemplated by the present disclosure. For instance, health and fitness data may be used to provide insights into a user's general wellness, or state of well-being during various moments or events in their lives.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by end-users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries or regions may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of DA management services, the present technology can be configured to allow users to select to "opt in" or "opt out" of participation in the collection of personal information data during registration for services or anytime thereafter. In another example, users can select not to provide their content and other personal information for inclusion in graph databases of others. In yet another example, users can select to limit the length of time their personal information data is maintained by a third party and/or entirely prohibit the development of a knowledge graph or other metadata profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be suggested for sharing to users by inferring preferences based on non-personal information data or a bare minimum amount of personal information within a user's relational database, such as the quality level of the content (e.g., focus, exposure levels, etc.) or the fact that certain content is being requested by a device associated with a contact of the user, other non-personal information available to the DA management system, or publicly available information.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., many of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

We claim:

1. A method of managing digital assets (DAS), the method comprising:
  establishing, by one or more server devices, a personal DA library having DAs and related DA records, each of the DA records including a set of fields including a master record of a respective DA;
  establishing, by the one or more server devices, a shared DA library separate from the personal DA library;
  receiving, by the one or more server devices, a share DA instruction related to a particular DA in the personal DA library;
  transferring, by the one or more server devices, a first part of the DA record for the particular DA from the personal DA library to the shared DA library, the first part including the master record;
  after completion of said transferring, maintaining, by the one or more server devices, a second part of the DA record for the particular DA in the personal DA library, the second part not including the master record;

receiving a participant exit or removal request, by the one or more server devices, related to the shared DA library by a requesting participant of the shared DA library;

in response to the participant exit or removal request, obtaining contribution information for DAs in the shared DA library; and performing participant exit or removal operations based on the contribution information related to the requesting participant.

2. The method of claim 1, wherein the second part of the DA record includes a set of private properties for the particular DA, the set of private properties not included with first part of the DA record transferred to the shared DA library.

3. The method of claim 2, wherein the private properties include a viewcount for the DA record.

4. The method of claim 2, wherein the private properties include face identification information for the DA record.

5. The method of claim 1, wherein the second part of the DA record is updated to include move status information related to transferring the first part of the DA record to the shared DA library.

6. The method of claim 1, wherein transferring the first part of the DA record for the particular DA from the personal DA library to shared DA library includes queueing the related transfer until a later time.

7. The method of claim 6, further comprising maintaining the master record of the particular DA in the second part of the DA record until the transfer is completed.

8. The method of claim 1, further comprising displaying an intermediate state in the shared DA library before transfer of the first part of the DA record to the shared DA library is complete.

9. The method of claim 1, further comprising displaying DAs in the personal DA library and DAs in the shared DA library together in a DA viewer application of a first participant.

10. The method of claim 1, further comprising:
receiving an unshare request, by the one or more server devices, for the particular DA by a participant of the shared DA library; and
in response to the unshare request, initiating transfer of the particular DA from the shared DA library to the requester's personal DA library.

11. The method of claim 1, further comprising:
in response to the participant exit or removal request, establishing an exit DA library with copies of DAs in the shared DA library; and
maintaining the exit DA library until the existing participant completes an exit or removal process.

12. A system comprising:
one or more processors;
a memory for storing program instructions for the one or more processors, where the instructions, when executed, cause the one or more processors to:
establish a personal digital asset (DA) library having DAs and related DA records, each of the DA records including a set of fields including a master record of a respective DA;
establish a shared DA library separate from the personal DA library;
receive a share DA instruction related to a particular DA in the personal DA library;
transfer a first part of the DA record for the particular DA from the personal DA library to the shared DA library, the first part including the master record;
after completion of said transferring, maintain a second part of the DA record for the particular DA in the personal DA library, the second part not including the master record;
receive a participant exit or removal request related to the shared DA library by a requesting participant of the shared DA library;
in response to the participant exit or removal request, obtain contribution information for DAs in the shared DA library; and
perform participant exit or removal operations based on the contribution information related to the requesting participant.

13. The system of claim 12, wherein the second part of the DA record includes a set of private properties for the particular DA, the set of private properties not included with first part of the DA record transferred to the shared DA library.

14. The system of claim 12, wherein the instructions, when executed, cause the one or more processors to display an intermediate state in the shared DA library before transfer of the first part of the DA record to the shared DA library is complete.

15. The system of claim 12, further comprising an end-user device having a DA viewer application, wherein DAs in the personal DA library and DAs in the shared DA library are displayed together in the DA viewer application.

16. The system of claim 12, wherein the instructions, when executed, cause the one or more processors to:
receive an unshare request, by the one or more server devices, for the particular DA by a participant of the shared DA library; and
in response to the unshare request, initiate transfer of the particular DA from the shared DA library to the requester's personal DA library.

17. The system of claim 12, wherein the instructions, when executed, cause the one or more processors to:
in response to the participant exit or removal request, establish an exit DA library with copies of DAs in the shared DA library; and
maintain the exit DA library until the existing participant completes an exit or removal process.

18. A non-transitory computer-readable medium comprising instructions that, when executed, configure one or more processors to:
establish a personal digital asset (DA) library having DAs and related DA records, each of the DA records including a set of fields including a master record of a respective DA;
establish a shared DA library separate from the personal DA library;
receive a share DA instruction related to a particular DA in the personal DA library;
transfer a first part of the DA record for the particular DA from the personal DA library to the shared DA library, the first part including the master record;
after completion of said transferring, maintain a second part of the DA record for the particular DA in the personal DA library, the second part not including the master record;
receive a participant exit or removal request related to the shared DA library by a requesting participant of the shared DA library;

in response to the participant exit or removal request, obtain contribution information for DAs in the shared DA library; and perform participant exit or removal operations based on the contribution information related to the requesting participant.

* * * * *